US012603548B2

(12) United States Patent
Stanke et al.

(10) Patent No.: US 12,603,548 B2
(45) Date of Patent: Apr. 14, 2026

(54) POWER TOOL INCLUDING CONFIGURABLE MOTOR STATOR WINDINGS

(71) Applicant: MILWAUKEE ELECTRIC TOOL CORPORATION, Brookfield, WI (US)

(72) Inventors: Zachary G. Stanke, Wausau, WI (US); Gareth Mueckl, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 273 days.

(21) Appl. No.: 17/704,986

(22) Filed: Mar. 25, 2022

(65) Prior Publication Data

US 2022/0311309 A1 Sep. 29, 2022

Related U.S. Application Data

(60) Provisional application No. 63/166,452, filed on Mar. 26, 2021.

(51) Int. Cl.
*H02K 7/14* (2006.01)
*H02K 1/16* (2006.01)
(Continued)

(52) U.S. Cl.
CPC .............. *H02K 7/145* (2013.01); *H02K 1/16* (2013.01); *H02K 3/28* (2013.01); *H02P 25/184* (2013.01)

(58) Field of Classification Search
CPC .......... H02K 1/16; H02K 1/185; H02K 1/278; H02K 3/04; H02K 3/12; H02K 3/28;

H02K 5/225; H02K 7/14; H02K 7/145; H02K 7/116; H02K 11/20; H02K 11/21; H02K 11/215; H02K 11/24; H02K 11/27;
(Continued)

(56) References Cited

U.S. PATENT DOCUMENTS

| | | | |
|---|---|---|---|
| 4,371,906 A | 2/1983 | Alessio et al. | |
| 5,068,559 A | 11/1991 | Satake et al. | |

(Continued)

FOREIGN PATENT DOCUMENTS

| | | |
|---|---|---|
| CN | 209692454 U | 11/2019 |
| DE | 102013009036 A1 | 12/2014 |

(Continued)

OTHER PUBLICATIONS

17704986_2024-03-04_EP_3028823_A1_H.pdf (Year: 2024).*
(Continued)

*Primary Examiner* — Christopher M Koehler
*Assistant Examiner* — Ahmed F Seck
(74) *Attorney, Agent, or Firm* — Michael Best & Friedrich LLP

(57) ABSTRACT

A power tool that includes an electric motor. The electric motor includes a plurality of stator windings, a plurality of switches for selectively coupling the plurality of stator windings in a first configuration or a second configuration, and a controller connected to the plurality of switches. The controller is configured to control the plurality of switches to configure the plurality of stator windings in the first configuration, monitor a condition of the power tool, and control the plurality of switches to configure the plurality of stator windings in the second configuration based on the condition of the power tool.

18 Claims, 33 Drawing Sheets

(51) Int. Cl.
    *H02K 3/28*     (2006.01)
    *H02P 25/18*    (2006.01)
(58) Field of Classification Search
    CPC ........ H02K 11/25; H02K 11/28; H02K 11/30;
        H02K 11/33; H02K 15/06; H02K 15/061;
        H02K 15/062; H02K 15/08; H02K
        15/085; H02K 17/12; H02K 17/14; H02K
        19/10; H02K 19/12; H02K 19/32; H02K
        27/02; H02K 27/08; H02K 27/10; H02K
        27/12; H02K 27/14; H02K 27/20; H02K
                            23/04; H02K 23/36
    See application file for complete search history.

(56)                  References Cited

U.S. PATENT DOCUMENTS

| | | | |
|---|---|---|---|
| 5,614,799 | A | 3/1997 | Anderson et al. |
| 5,642,021 | A | 6/1997 | Liang et al. |
| 5,821,660 | A | 10/1998 | Anderson |
| 5,912,522 | A | 6/1999 | Rivera |
| 6,097,127 | A | 8/2000 | Rivera |
| 6,493,924 | B2 | 12/2002 | Das |
| 6,680,997 | B2 | 1/2004 | Das |
| 6,894,455 | B2 | 5/2005 | Cai et al. |
| 7,602,137 | B2 * | 10/2009 | Du ........................... H02P 29/40 |
| | | | 318/773 |
| 7,893,586 | B2 | 2/2011 | West et al. |
| 8,076,873 | B1 | 12/2011 | Lucas et al. |
| 8,493,017 | B2 | 7/2013 | Dietl |
| 8,796,964 | B2 | 8/2014 | Dietl |
| 10,523,139 | B2 | 12/2019 | Cox |
| 10,523,140 | B2 | 12/2019 | Cox |
| 10,833,611 | B2 | 11/2020 | Cox |
| 2012/0068656 | A1 * | 3/2012 | Fulton ..................... H02K 9/19 |
| | | | 318/497 |
| 2015/0263660 | A1 | 9/2015 | Patrick et al. |
| 2017/0077851 | A1 * | 3/2017 | Ma ............................ B25F 5/00 |
| 2017/0234484 | A1 * | 8/2017 | Vanko ................... B24B 23/028 |
| 2018/0109210 | A1 | 4/2018 | Cox |
| 2018/0109211 | A1 * | 4/2018 | Cox .......................... B25F 5/02 |
| 2018/0175757 | A1 | 6/2018 | Tanimoto et al. |
| 2020/0321899 | A1 | 10/2020 | Akutsu |
| 2021/0028729 | A1 | 1/2021 | Cox |

FOREIGN PATENT DOCUMENTS

| | | | |
|---|---|---|---|
| DE | 102018129161 B3 | 9/2019 | |
| DE | 102019208889 A1 | 12/2020 | |
| EP | 0364589 B1 | 7/1995 | |
| EP | 2086094 A2 | 8/2009 | |
| EP | 3028823 A1 * | 6/2016 | ............. B25D 11/00 |
| JP | 2000116164 A | 4/2000 | |
| JP | 2010069616 A | 4/2010 | |
| JP | 2016194535 A | 11/2016 | |
| JP | 2017121158 A | 7/2017 | |
| JP | 2020145802 A | 9/2020 | |
| KR | 1020180101369 A | 9/2018 | |
| WO | 2013081191 A2 | 6/2013 | |
| WO | 2019207661 A1 | 10/2019 | |
| WO | WO-2020026299 A1 * | 2/2020 | ......... G05B 19/4183 |
| WO | 2021038817 A1 | 3/2021 | |

OTHER PUBLICATIONS

17704986_2024-09-09_WO_2020026299_A1_H.pdf (Year: 2024).*
International Search Report and Written Opinion for Application
No. PCT/US2022/022004 dated Jul. 11, 2022 (10 pages).
Japanese Patent Office Action for Application No. 2023-556498
dated Oct. 1, 2024 (8 pages including machine English translation).
Extended European Search Report for Application No. 22776748.0
dated Feb. 7, 2025 (9 pages).

* cited by examiner

| Phase | #SSRs |
|--------|-------|
| Orange | 1 |
| Blue | 1 |
| Green | 0 |

| Phase | #SSRs |
|--------|-------|
| Orange | 0 |
| Blue | 1 |
| Green | 0 |

1025

MOTOR IN DELTA
CONFIGURATION — 1030

SWITCH 1 ON
SWITCH 2 ON
SWITCH 3 OFF — 1035

TURN SWITCH 1 OFF
TURN SWITCH 2 OFF
TURN SWITCH 3 ON — 1040

SWITCH 1 OFF
SWITCH 2 OFF
SWITCH 3 ON — 1045

MOTOR IN WYE
CONFIGURATION — 1050

PHASE C 400, 405

1120

SSR4

SSR5

1125

1110

SSR2

420, 425

PHASE A 410, 415

SSR3

1115

PHASE B

SSR1

1105

1100

1300

OPERATE MOTOR USING
FIRST MOTOR
CONFIGURATION — 1305

RECEIVE SIGNAL TO
CHANGE MOTOR
CONFIGURATION — 1310

CHANGE MOTOR
CONFIGURATION — 1315

OPERATE MOTOR USING
SECOND MOTOR
CONFIGURATION — 1320

1325

MOTOR IN DELTA
MOTOR CONFIGURATION — 1330

SWITCH 1 OFF
SWITCH 2 ON
SWITCH 3 ON
SWITCH 4 ON
SWITCH 5 OFF — 1335

TURN SWITCH 1 ON
TURN SWITCH 2 OFF
TURN SWITCH 3 OFF
TURN SWITCH 4 OFF
TURN SWITCH 5 ON — 1340

SWITCH 1 ON
SWITCH 2 OFF
SWITCH 3 OFF
SWITCH 4 OFF
SWITCH 5 ON — 1345

MOTOR IN WYE
CONFIGURATION — 1350

SERIES

MOTOR TAP VU

1805 — V1

1810 — V2

MOTOR TAP VW

1815

PARALLEL

MOTOR TAP VU

1805 — V1

1810 — V2

MOTOR TAP VW

1800

2200

2255

WINDING(S)
IN PARALLEL
CONFIGURATION — 2260

SWITCH 1 ON
SWITCH 2 OFF
SWITCH 3 ON — 2265

TURN SWITCH 1 OFF
TURN SWITCH 2 ON
TURN SWITCH 3 OFF — 2270

SWITCH 1 OFF
SWITCH 2 ON
SWITCH 3 OFF — 2275

WINDING(S)
IN SERIES
CONFIGURATION — 2280

POWER TOOL INCLUDING CONFIGURABLE MOTOR STATOR WINDINGS

RELATED APPLICATIONS

This application claims the benefit of U.S. Provisional Patent Application No. 63/166,452, filed Mar. 26, 2021, the entire content of which is hereby incorporated by reference.

FIELD

Embodiments described herein provide a power tool including configurable motor stator windings.

SUMMARY

Power tools described herein include an electric motor including a plurality of stator windings, a plurality of switches for selectively coupling the plurality of stator windings in a first configuration or a second configuration, and a controller connected to the plurality of switches. The controller is configured to control the plurality of switches to configure the plurality of stator windings in the first configuration, monitor a condition of the power tool, and control the plurality of switches to configure the plurality of stator windings in the second configuration based on the condition of the power tool.

Power tools described herein include an electric motor having a plurality of stator windings, each of the plurality of stator windings including a first phase winding and a second phase winding, a plurality of switches for selectively coupling the first phase winding and the second phase winding in a first configuration and a second configuration, and a controller connected to the plurality of switches. The controller is configured to control the plurality of switches to configure each of the first phase windings and the second phase windings in the first configuration, monitor a condition of the power tool, and control the plurality of switches to configure each of the first phase windings and the second phase windings in the second configuration based on the condition of the power tool.

Methods described herein provide for operating an electric motor. The electric motor includes a plurality of stator windings. The methods include controlling a plurality of switches to configure the plurality of stator windings in a first configuration, monitoring a condition of the electric motor, and controlling the plurality of switches to configure the plurality of stator windings in a second configuration based on the condition of the electric motor.

Before any embodiments are explained in detail, it is to be understood that the embodiments are not limited in their application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Figure 1:
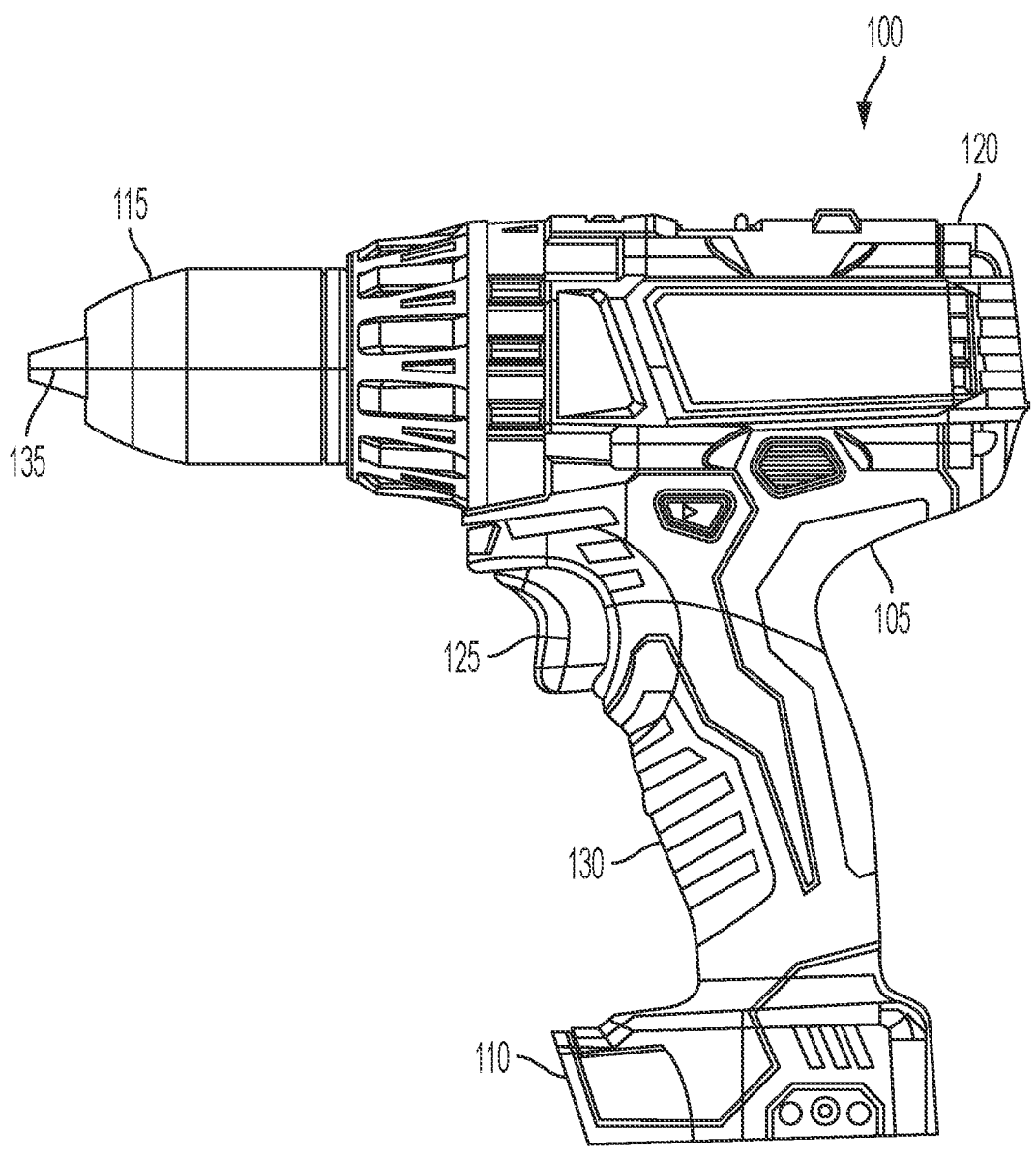
FIG. 1 illustrates a power tool, in accordance with embodiments described herein.

FIG. 1 illustrates an example power tool 100, according to some embodiments. The power tool 100 includes a housing 105, a battery pack interface 110, a driver 115 (e.g., a chuck or bit holder), a motor housing 120, a trigger 125, and a handle 130. The motor housing 120 houses a motor 275 (see FIG. 2). A longitudinal axis 135 extends from the driver 115 through a rear of the motor housing 120. During operation, the driver 115 rotates about the longitudinal axis 135. The longitudinal axis 135 may be approximately perpendicular with the handle 130. While FIG. 1 illustrates a specific power tool 100 with a rotational output, it is contemplated that the motor configuration controls described herein may be used with multiple types of power tools, such as drills, drivers, powered screw drivers, powered ratchets, grinders, right angle drills, rotary hammers, pipe threaders, reciprocal saws, chainsaws, crimpers, pole-saws, circular saws, cut-off saws, die-grinder, table saws, vacuum cleaners, routers, augers, tillers, string trimmers, an off-road vehicle, a lawn mower, a material handling cart, nibblers, cable pullers/feeders, hydraulic pumps, PEX expanders, powered strap hoists, dust extractors, two-stage hydraulic tools, or another type of tool.

Figure 2:
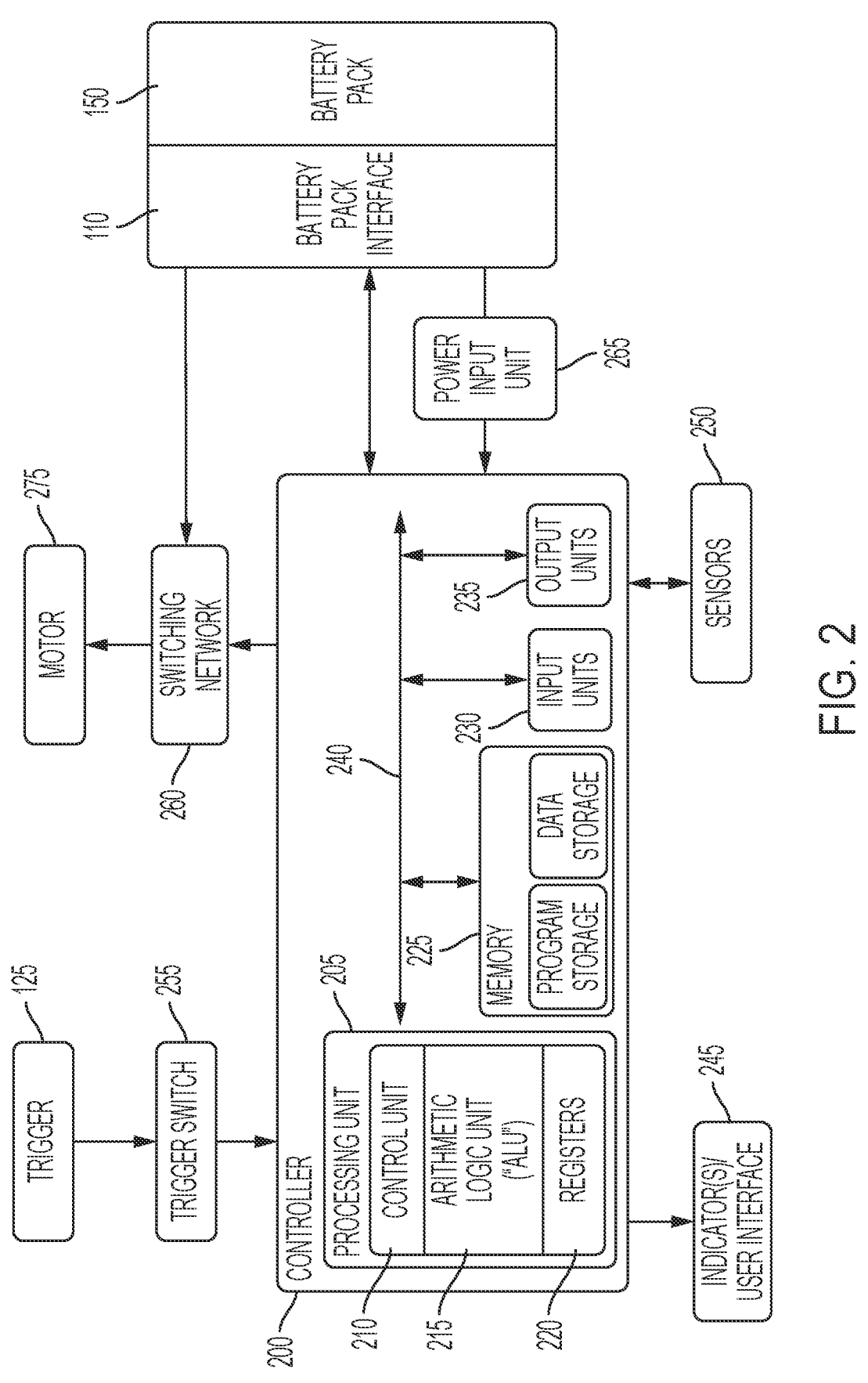
FIG. 2 illustrates a block diagram of a controller for the power tool of FIG. 1, in accordance with embodiments described herein.

A controller 200 for the power tool 100 is illustrated in FIG. 2. The controller 200 is electrically and/or communicatively connected to a variety of modules or components of the power tool 100. For example, the illustrated controller 200 is connected to indicators or a user interface 245, one or more sensors 250 (e.g., a speed sensor, a voltage sensor, a temperature sensor, an accelerometer, a proximity sensor, Hall effect sensors, force or grip pressure sensor, etc.), the trigger 125 (via a trigger switch 255), a power switching network 260, and a power input unit 265. In some embodiments, the power tool 100 alternatively or additionally includes a thermal accumulator that can be used by the controller 200 to determine (e.g., calculate, estimate, etc.) a temperature of the motor 275. In some embodiments, thermal accumulators can be used to determine (e.g., calculate, estimate, etc.) a temperature for other components of the power tool 100, such as terminals, bulk caps, and any other component of the power tool 100 that is susceptible to heating.

The controller 200 includes a plurality of electrical and electronic components that provide power, operational control, and protection to the components and modules within the controller 200 and/or power tool 100. For example, the controller 200 includes, among other things, a processing unit 205 (e.g., a microprocessor, an electronic processor, an electronic controller, a microcontroller, or another suitable programmable device), a memory 225, input units 230, and output units 235. The processing unit 205 includes, among other things, a control unit 210, an arithmetic logic unit ("ALU") 215, and a plurality of registers 220 (shown as a group of registers in FIG. 2), and is implemented using a known computer architecture (e.g., a modified Harvard architecture, a von Neumann architecture, etc.). The processing unit 205, the memory 225, the input units 230, and the output units 235, as well as the various modules connected to the controller 200 are connected by one or more control and/or data buses (e.g., common bus 240). The control and/or data buses are shown generally in FIG. 2 for illustrative purposes. The use of one or more control and/or data buses for the interconnection between and communication among the various modules and components would be known to a person skilled in the art in view of the embodiments described herein.

The memory 225 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 205 is connected to the memory 225 and executes software instruction that are capable of being stored in a RAM of the memory 225 (e.g., during execution), a ROM of the memory 225 (e.g., on a generally permanent basis), or another non-transitory computer readable medium such as another memory or a disc. Software included in the implementation of the power tool 100 can be stored in the memory 225 of the controller 200. The software includes, for example, firmware, one or more applications, program data, filters, rules, one or more program modules, and other executable instructions. The controller 200 is configured to retrieve from the memory 225 and execute, among other things, instructions related to the control processes and methods described herein. In other embodiments, the controller 200 includes additional, fewer, or different components.

The controller 200 drives the motor 275 to rotate driver 115 in response to a user's actuation of the trigger 125. The driver 115 may be coupled to the motor 275 via an output shaft. Depression of the trigger 125 actuates a trigger switch 255, which outputs a signal to the controller 200 to drive the motor 275, and therefore the driver 115. In some embodiments, the controller 200 controls a power switching network 260 (e.g., a FET switching bridge) to drive the motor 275. For example, the power switching network 260 may include a plurality of high side switching elements (e.g., FETs) and a plurality of low side switching elements. The controller 200 may control each FET of the plurality of high side switching elements and the plurality of low side switching elements to drive each phase of the motor 275. When the trigger 125 is released, the controller 200 may apply a braking force to the motor 275. For example, the power switching network 260 may be controlled to more quickly deaccelerate the motor 275. In some embodiments, phase advance and field weakening techniques are implemented to control the conduction angle used for driving the motor 275 (e.g., based on motor speed). In some embodiments, the no-load speed of the motor 275 is limited to a predetermined maximum value. In some embodiments, the power tool 100 does not include a transmission gear box. Rather, the output of the power tool 100 is directly driven by the motor (e.g., single speed power tools).

The indicators 245 are also connected to the controller 200 and receive control signals from the controller 200 to turn on and off or otherwise convey information based on different states of the power tool 100. The indicators 245 include, for example, one or more light-emitting diodes (LEDs), a display screen, etc. The indicators 245 can be configured to display conditions of, or information associated with, the power tool 100. For example, the indicators 245 can display information relating to the charging state of the battery pack 150, such as the charging capacity or state of charge. The indicators 245 may also display information relating to a fault condition, or other abnormality, of the power tool 100. In addition to or in place of visual indicators, the indicators 245 may also include a speaker or a tactile feedback mechanism to convey information to a user through audible or tactile outputs. In some embodiments, the indicators 245 display information relating to the configuration of the motor 275. For example, one or more LEDs are activated based on the DELTA or WYE configuration of the motor 275.

The battery pack interface 110 is connected to the controller 200 and is configured to couple with a battery pack 150. The battery pack interface 110 includes a combination of mechanical (e.g., a battery pack receiving portion) and electrical components configured to and operable for interfacing (e.g., mechanically, electrically, and communicatively connecting) the power tool 100 with the battery pack 150. The battery pack interface 110 is coupled to the power input unit 265. The battery pack interface 110 transmits the power received from the battery pack 150 to the power input unit 265. The power input unit 265 includes active and/or passive components (e.g., voltage step-down controllers, voltage converters, rectifiers, filters, etc.) to regulate or control the power received through the battery pack interface 110 and to the controller 200. In some embodiments, the battery pack interface 110 is also coupled to the power switching network 260. The operation of the power switching network 260, as controlled by the controller 200, determines how power is supplied to the motor 275.

Figures 3A, 3B, 3C:
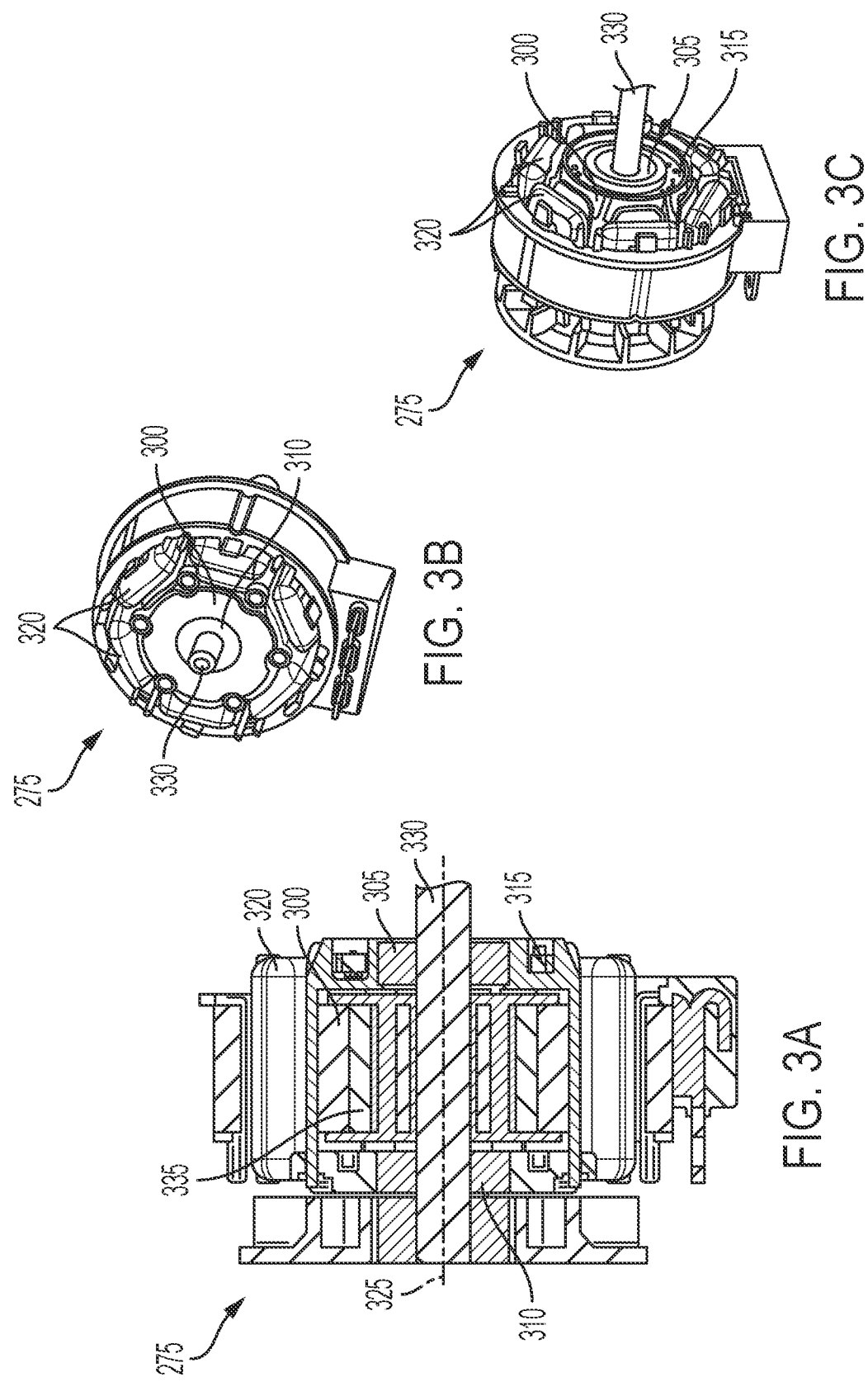
FIGS. 3A, 3B, and 3C illustrate a self-contained rotor and internal bearing of a brushless DC motor incorporated in the power tool of FIG. 1.

FIGS. 3A-3C illustrate the motor 275 or various portions thereof. The motor 275 is a brushless direct current ("BLDC") motor. As illustrated in FIGS. 3A-3C, the motor 275 includes features enabling a reduced axial length, which allows for a smaller tool housing and/or additional space for other components within a tool housing. The motor 275 includes a rotor 300, a front bearing 305, a rear bearing 310 (collectively referred to as the bearings 305, 310), a position sensor board assembly 315 within a stator envelope of the motor 275, and a shaft 330. A stator envelope is the space between the ends of the stator coils 320 along the length of the rotor axis 325. Recessing the rotor 300, the bearings 305, 310, and the position sensor board assembly 315 within the stator envelope allows a more compact motor 275 in the axial direction. Herein, the axial direction refers to the direction extending along the length (i.e., along the central axis) of the shaft 330 of the motor 275, while the radial direction refers to the direction extending radially from the length (i.e., the central axis) of the shaft 330. The rotor 300 is illustrated as being entirely within the stator envelope. In some embodiments, the bearings 305, 310 and the position sensor board assembly 315 are also entirely within the stator envelope. In some embodiments, the position sensor board assembly 315 is entirely within the stator envelope, but one or both of the bearings 305, 310 are partially inside the stator envelope and partially outside the stator envelope. In some embodiments, the bearings 305, 310 are entirely within the stator envelope, but the position sensor board assembly 315 is partially inside and partially outside the stator envelope. In some embodiments, the position sensor board assembly 315 and one bearing (e.g., either the front bearing 305 or the rear bearing 310) are entirely within the stator envelope, while the other bearing (e.g., the other of the front bearing 305 or the rear bearing 310) is partially inside and partially outside the stator envelope.

The position sensor board assembly 315 includes the Hall effect sensors (or other position sensors) to detect one or more of the rotational position, velocity, and acceleration of the motor 275. In some embodiments, sensorless motor control is employed and Hall effect sensors are not needed. The position sensor board assembly 315 is electrically coupled to a control PCB within the power tool 100 having the controller 200. The position sensor board assembly 315 includes a through-hole that receives both the motor shaft/spindle 330 and one of the motor bearings (e.g., the front bearing 305). By recessing the position sensor board assembly 315 within the stator envelope, rotor magnets 335 are brought into closer proximity with the Hall sensors, which improves detection of rotor position without extending the rotor magnets 335 and/or a rotor 300 axially.

Figure 3D:
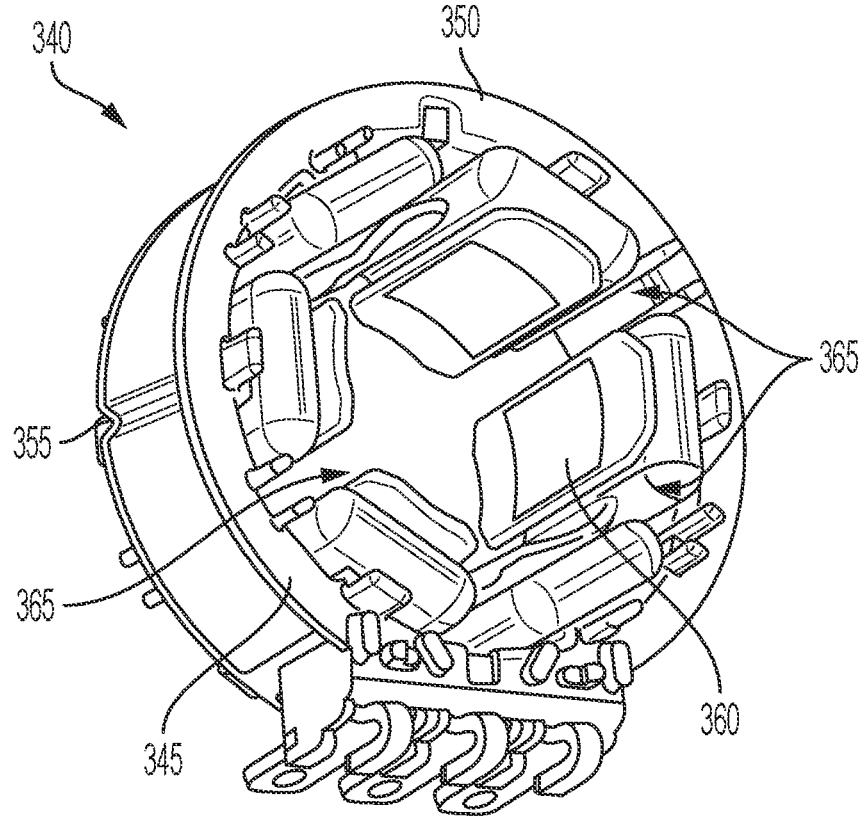
FIG. 3D illustrates an outer stator of a brushless DC motor incorporated in the power tool of FIG. 1.

The motor 275 includes the rotor 300 with the rotor magnets 335 (e.g., permanent magnets) and an outer stator 340 with coil windings that are selectively energized to drive the rotor 300. Referring to FIG. 3D, the outer stator 340 includes a stator frame 345 having a first stator end cap 350 on a front side of the stator 340 and a second stator end cap 355 on a rear side of the stator 340. The first stator end cap 350 and the second stator end cap 355 may be integrally formed as a single piece (i.e., the stator frame 345) or, alternatively, may be two separate pieces that together form the stator frame 345. The stator frame 345 may be formed by an injection molding process, for example, by injecting a resin material into a mold including a stator lamination stack. Accordingly, the stator frame 345 may be a monolithic structure formed of hardened resin. The stator 340 includes a plurality of stator laminations. The stator laminations and the stator frame 345 include teeth 360 around which the coils are wound. Between each stator tooth 360, at an inner radial end of the stator 340, is a gap 365.

Figure 4:
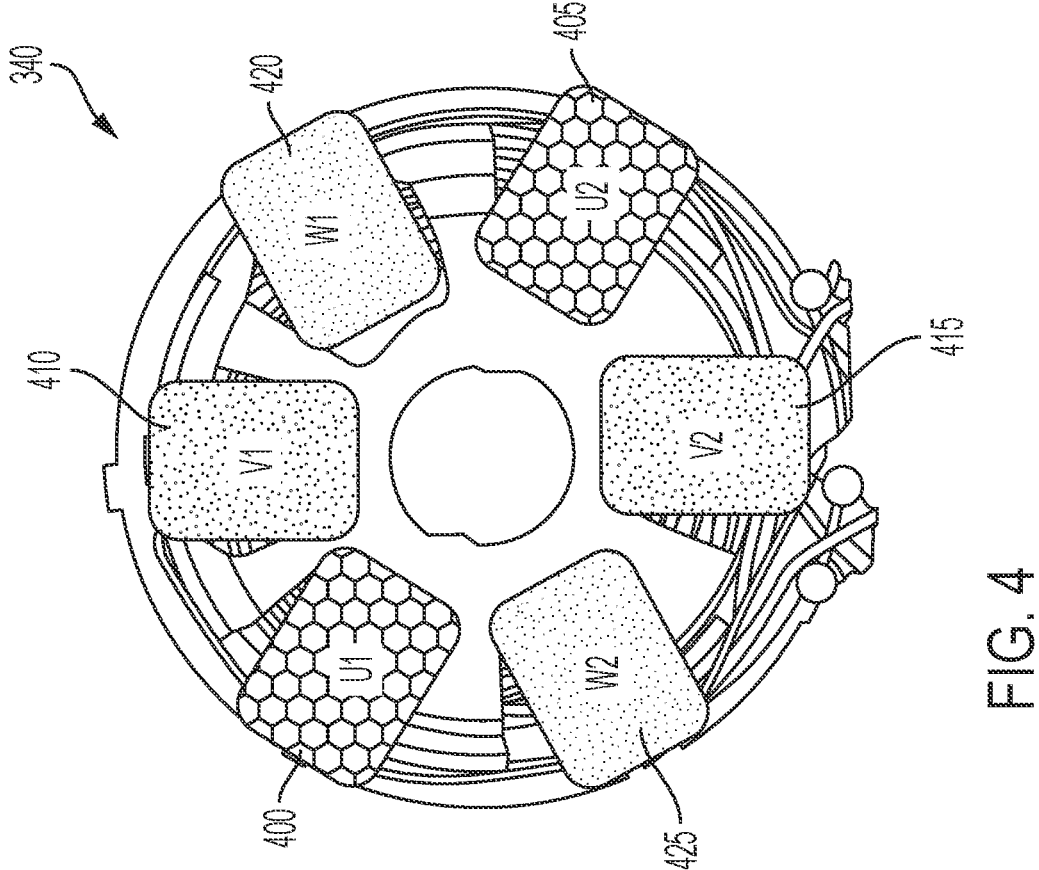
FIG. 4 illustrates a motor stator including a plurality of field windings.
Figure 4:
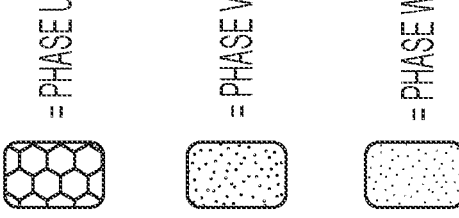

FIG. 4 illustrates the motor stator 340 including a plurality of stator poles. The state poles are generally identified as stator phases having designations of U, V, and W, or alternatively A, B, and C. Each phase of the stator 340 includes two phase windings. Specifically, phase U includes a first phase winding 400 and a second phase winding 405. Phase V includes a first phase winding 410 and a second phase winding 415. Phase W includes a first phase winding 420 and a second phase winding 425. Although the stator 340 is illustrated in FIG. 4 as including three phases with each phase including two phase windings, in some embodiments, the stator 340 includes more than three phases or fewer than three phases. For example, the stator 340 can include a single phase, two phases, four phases, five phases, six to ten phases, or greater than ten phases (e.g., ten to twenty phases). Also, in some embodiments, each phase includes more than two phase windings. For example, each phase can include three, four, five, six, seven, eight, nine, ten, or more than ten (e.g., ten to twenty) phase windings. In embodiments where the motor stator 340 includes two stator poles, and each phase of the stator 340 may include one phase winding.

Figure 5B:
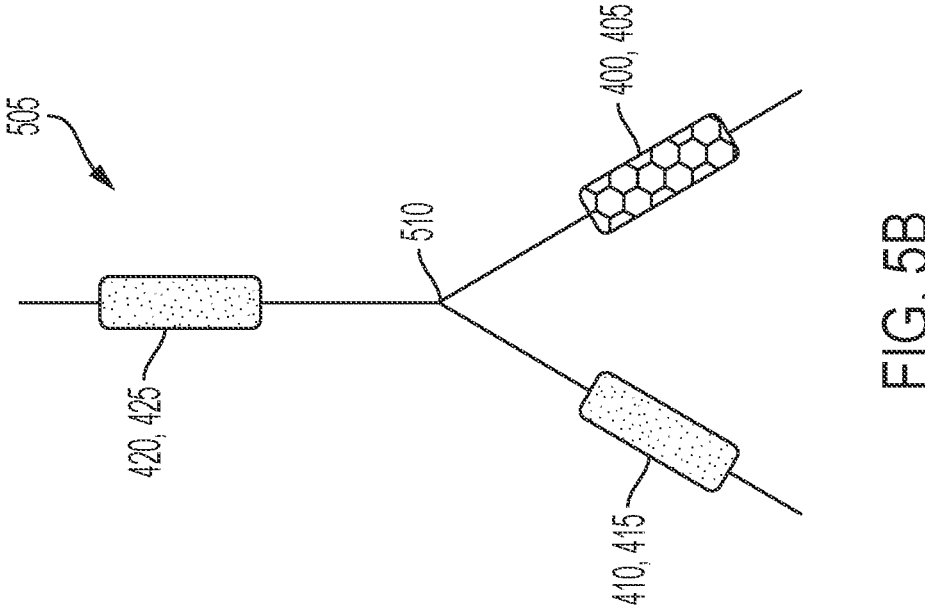
FIG. 5B illustrates a motor stator WYE connection configuration.
Figure 5A:
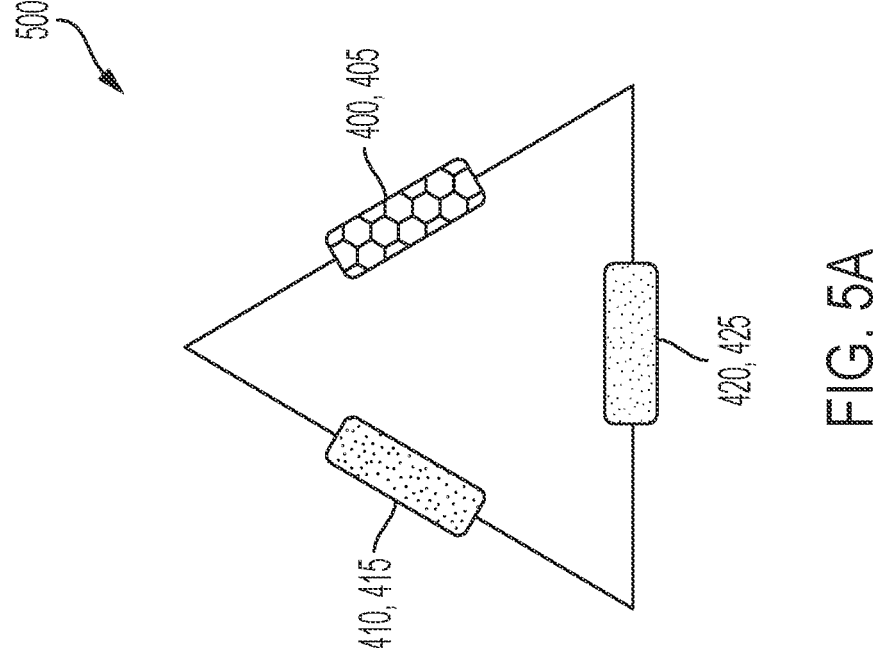
FIG. 5A illustrates a motor stator DELTA connection configuration.

The phase windings of the stator 340 can be connected in various motor configurations. FIGS. 5A and 5B illustrate two possible motor configurations for the stator 340. FIG. 5A illustrates a DELTA configuration 500 for the stator 340. In the DELTA configuration, the phase windings 400, 405 are connected to each of the phase windings 410, 415 and the phase windings 420, 425. The phase windings 410, 415 are connected to each of the phase windings 400, 405 and the phase windings 420, 425. The phase windings 420, 425 are connected to each of the phase windings 400, 405 and the phase windings 410, 415. FIG. 5A illustrates a WYE configuration 505 for the stator 340. In the WYE connection, the phase windings 400, 405, the phase windings 410, 415, and the phase windings 420, 425 are all connected to a common point 510. The advantages of the DELTA connection and the WYE, as well as techniques for transitioning from one configuration to the other configuration, are described in greater detail below. The motor 275 can be initially operated in either the DELTA configuration or the WYE configuration depending upon the desired output characteristics of the power tool 100.

Figure 6:
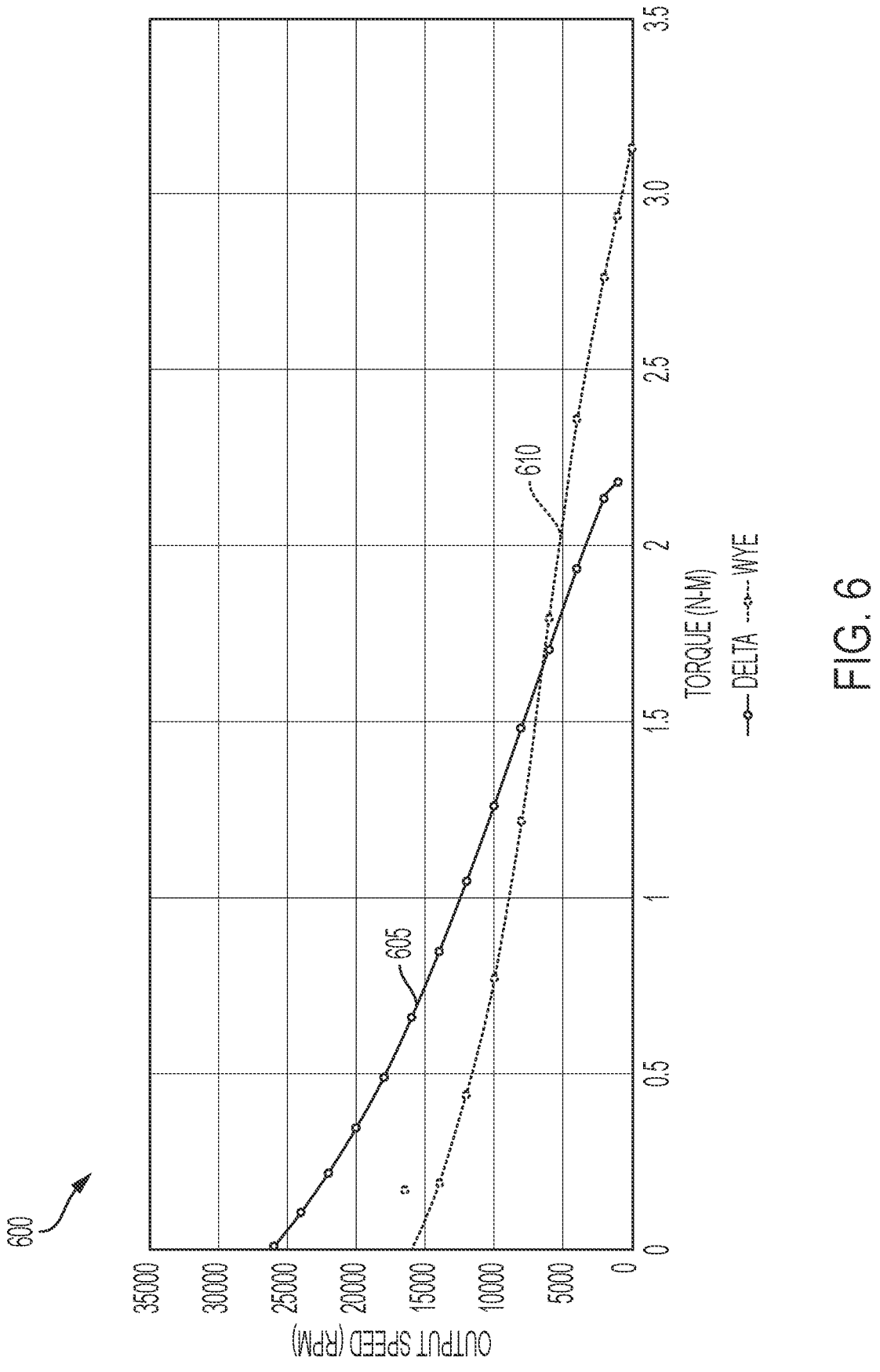
FIG. 6 illustrates torque-speed curves for motors in WYE and DELTA connection configurations.

FIG. 6 illustrates a graph 600 of torque-speed curves for a DELTA configured motor and a WYE configured motor. The torque-speed curve 605 for the DELTA configured motor demonstrates a higher output speed value in rotations per minute ("RPM") in a low or no torque situation when compared to a WYE configured motor. However, the DELTA configured motor produces less output torque when compared to a WYE configured motor in a low speed situation. Conversely, the torque-speed curve 610 for the WYE configured motor demonstrates lower output speed in RPM in a low torque or no torque situation when compared to a DELTA configured motor. However, the WYE configured motor produces more torque when compared to a DELTA configured motor in a low speed situation.

Figure 7:
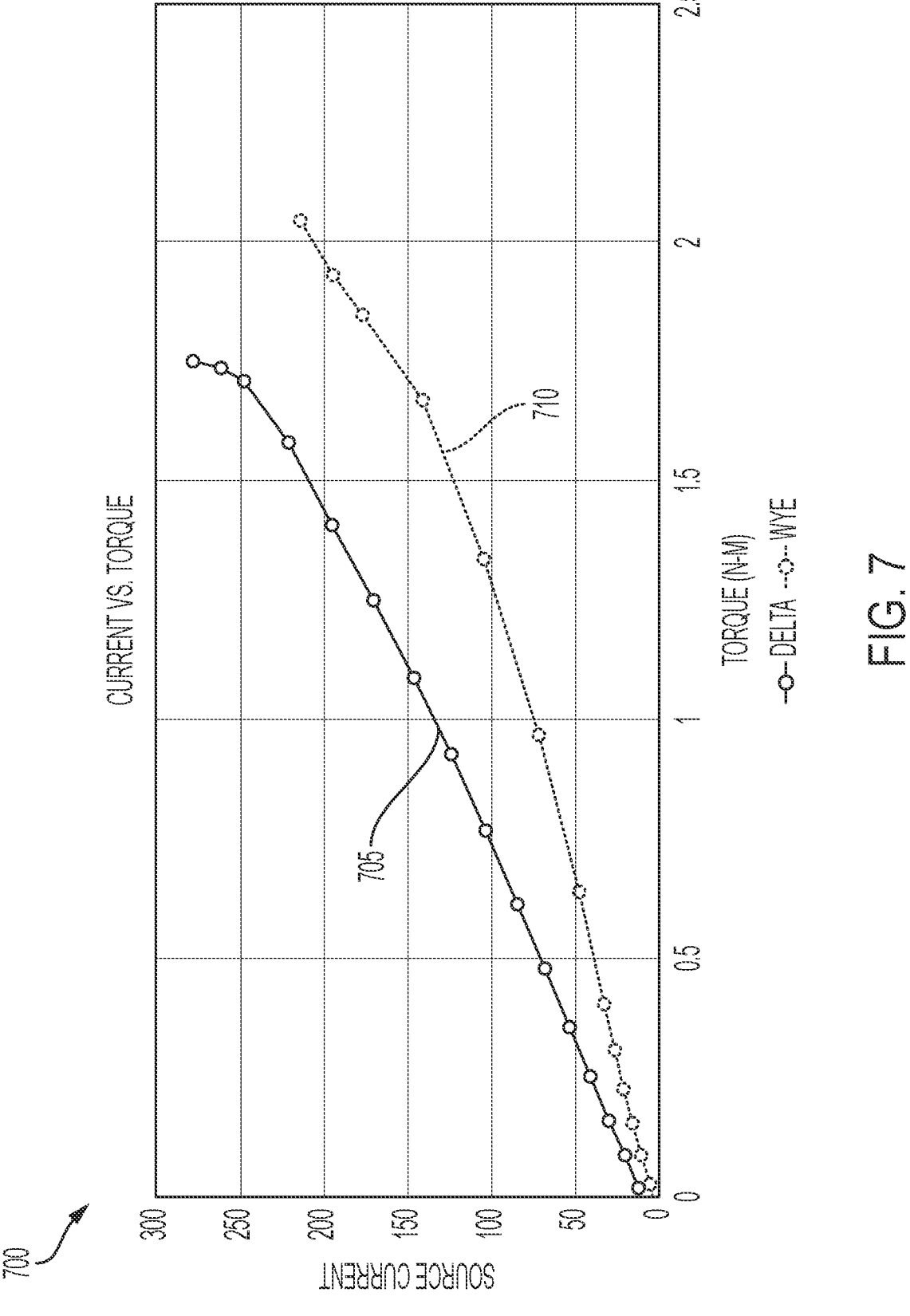
FIG. 7 illustrates torque-current curves for motors in WYE and DELTA connection configurations.

FIG. 7 illustrates a graph 700 of torque-current curves for a DELTA configured motor and a WYE configured motor. The torque-current curve 705 for the DELTA configured motor demonstrates that the DELTA configured motor generally draws higher currents when compared to the torque-current curve 710 for the WYE configured motor. When the motor stalls, this difference in source current is the result of an approximately three times (3×) increase in motor resistance in the WYE configuration versus the DELTA configuration. Although the motor resistance change of 3× occurs, the overall system resistance only increases by approximately 33% when switching from the DELTA configuration to the WYE configuration. Additionally, a WYE configured motor has a greater back-emf (BEMF) and RPM, which reduces current when compared to a DELTA configured motor.

Because the DELTA configured motor and the WYE configured motor have different operational properties or characteristics, it would be advantageous to be able to switch between a DELTA configured motor and a WYE configured motor in order to take advantage of the strengths of each motor configuration. Specifically, it would be advantageous to be able to take advantage of the increased speed of the DELTA configuration and the increased torque (and decreased current) of the WYE configuration.

Figure 8:
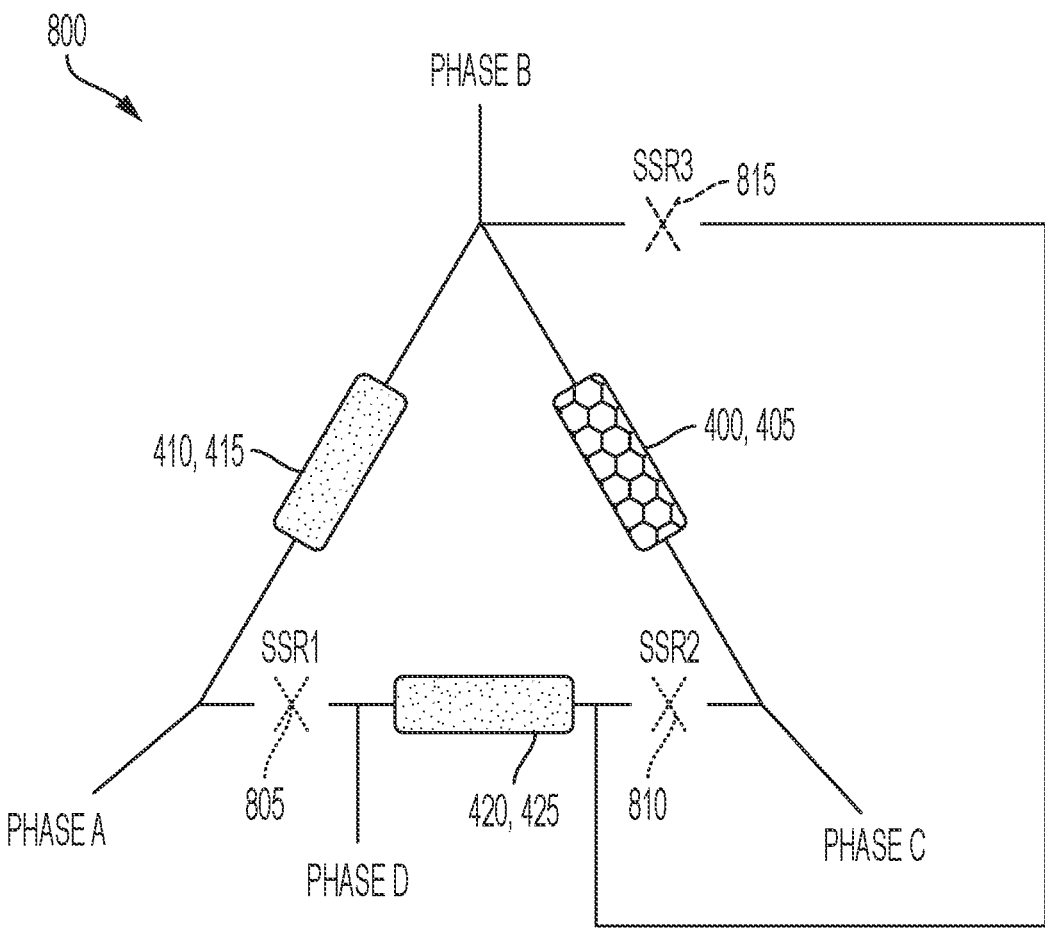
FIG. 8 illustrates a circuit for configuring a motor in a WYE or DELTA configuration.

FIG. 8 illustrates a circuit 800 for switching between a DELTA configuration of a motor and a WYE configuration of a motor. In the circuit illustrated in FIG. 8, in addition to phase A, phase B, and phase C, a fourth phase D is included in the circuit 800. For example, an additional pair of phase switches can be added to the power switching network 260. As a result, rather than having a total of six switches (e.g., MOSFETs) in the power switching network 260, the power switching network 260 could include eight switches (e.g., two switches per phase of the motor 275). However, because the motor 275 only includes three pairs of phase windings in the stator 340, only three of the four motor phases are actively used at a given time. Which of the phases are active depends upon the selected configuration of the stator 340.

As shown in FIG. 8, the circuit 800 also includes a first switching point 805, a second switching point 810, and a third switching point 815. The first switching point 805 is between phase A and phase D, the second switching point 810 is between phase C and the third switching point 815, and the third switching point 815 is between phase B and the second switching point 810. In some embodiments, each switching point includes one switch (e.g., a FET, a MOS-FET, a solid-state relay, etc.). In other embodiments, each switching point includes more than one switch (e.g., two switches back-to-back [common source or common drain] to create four-quadrant switch implementation). Accordingly, in some embodiments, the circuit 800 includes a total of eight additional switches when compared to a conventional three phase DC motor that is permanently configured in either a DELTA configuration or a WYE configuration. The switches at the switching points 805, 810, 815 are selectively controlled by the controller 200 to configure the stator 340 in either a DELTA configuration or a WYE configuration.

Figure 9A:
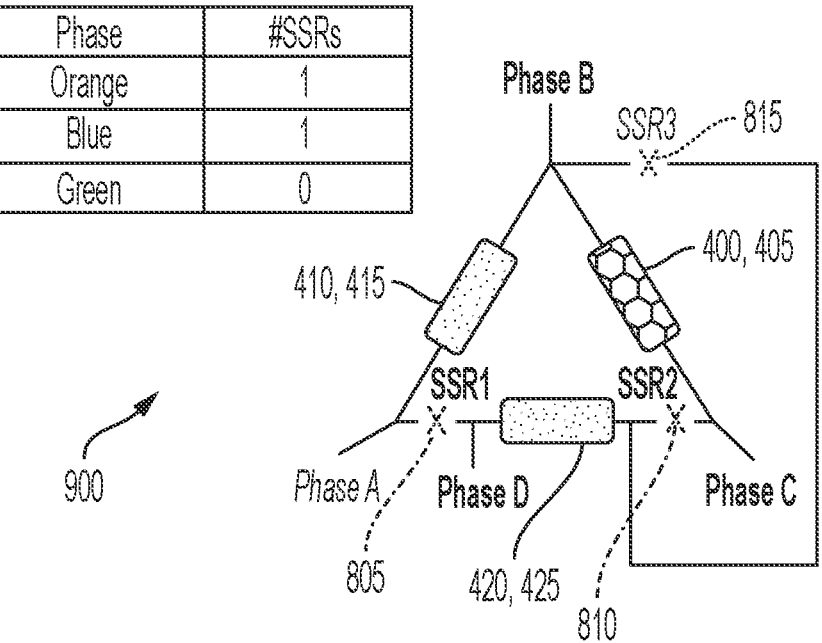
FIG. 9A illustrates a technique for configuring a motor in a DELTA configuration.

FIG. 9A illustrates a circuit 900 for the stator 340 in a DELTA configuration of the four-phase circuit of FIG. 8. In the DELTA configuration, the first switching point 805 and the second switching point 810 are configured to be closed (i.e., conducting state), and the third switching point 815 is configured to be open (i.e., non-conducting state). As also illustrated in FIG. 9A, the stator 340 is using the additional fourth phase D rather than the conventional phase A. As a result, the phase windings 410, 415 include one the first switching point 805 (and associated switches) and the phase windings 420,425 include the second switching point 810 (and associated switches).

Figure 9B:
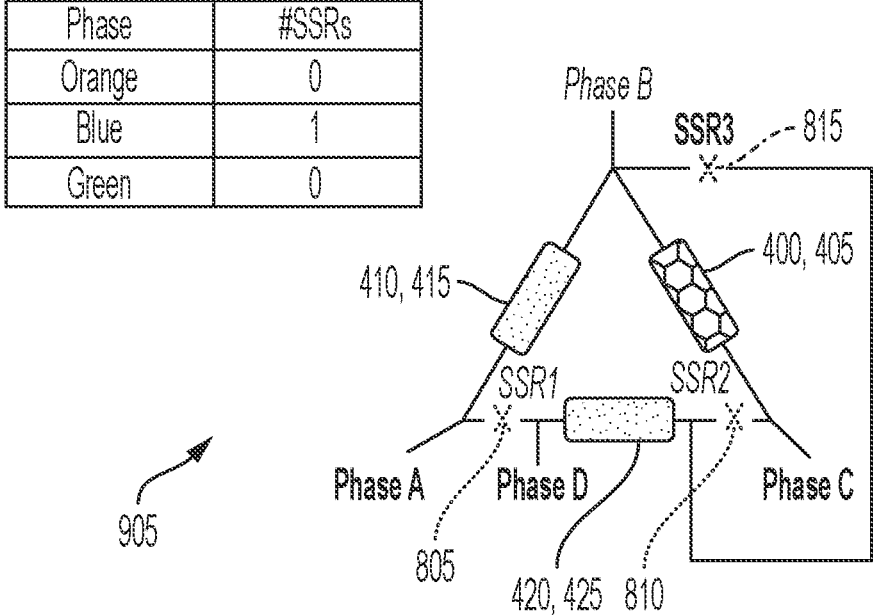
FIG. 9B illustrates a technique for configuring a motor in a WYE configuration.

FIG. 9B illustrates a circuit 905 for the stator 340 in a WYE configuration of the four-phase circuit of FIG. 8. In the WYE configuration, the first switching point 805 and the second switching point 810 are configured to be open (i.e., non-conducting state), and the third switching point 815 is configured to be closed (i.e., conducting state). As also illustrated in FIG. 9B, the stator 340 is using the additional fourth phase D rather than the conventional phase B. As a result, the phase windings 420,425 include the third switching point 815 (and associated switches).

Figure 10A:
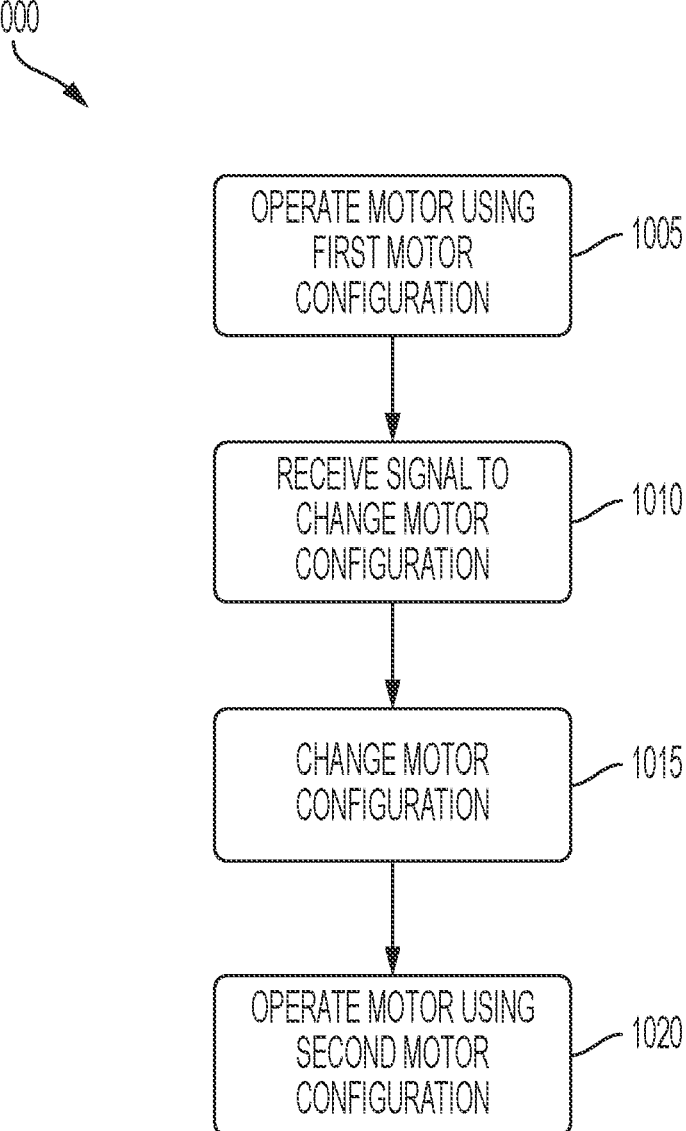
FIG. 10A is a process for changing a motor configuration, according to embodiments described herein.

FIG. 10A is a general process 1000 for switching the circuit 800 of FIG. 8 between the DELTA configuration of circuit 900 and the WYE configuration of circuit 905, and vice versa. At STEP 1005, the power tool 100 is being operated by the controller 200 with the motor 275 having the stator 340 in a first motor configuration. Operation of the power tool 100 generally refers to the motor 275 rotating in order to produce a rotational output of the shaft 330. The rotational motion of the shaft 330 is then used to produce a desired output operation, which varies by the type of power tool 100 (e.g., a rotational output, a reciprocating output, a pulling output, etc.). At STEP 1010, the controller 200 receives a signal to change the configuration of the motor 275. In some embodiments, the signal is provided by a user through the user interface 245. For example, a user can select or adjust a shift point based on a particular application (e.g., wood, metal, embedded nail, etc.). In other embodiments, the signal is generated internally by the controller 200 based on a condition of the power tool 100 and/or motor 275. For example, the controller 200 can generate the signal to change motor configuration or shift point based on a speed of the motor, a torque of the motor, a current of the motor, a load point of the motor, a field weakening conduction angle of the motor (e.g., an amount of field weakening used to maintain the current speed), a type of battery pack connected to the power tool (e.g., based on the capacity of the battery pack), a state of charge of a battery pack (e.g., to optimize runtime over performance), battery pack impedance (e.g., measured based on an voltage and current of the battery pack), grip strength above a grip strength threshold, the presence of one hand on the power tool 100, the presence of two hands on the power tool 100 (e.g., a main handle and an affixed or detachable side handle), a temperature (e.g., motor temperature) above or below a temperature threshold, an age of a battery pack (e.g., number of charge/discharge cycles, manufacture date, battery pack identification, battery pack model number, etc.), or any combination thereof (e.g., a plurality of factors), etc. In some embodiments, the controller 200 can generate the signal to change motor configuration or shift point based on whether or not a gate drive refresh ("GDR") is active. GDR is a forced pulse-width modulation ("PWM") signal that is intended to keep a gate driver power rail voltage above a shutdown voltage (see gate drive circuit 2400 in FIG. 24). For example, the configuration of the motor 275 can be switched from a DELTA configuration to a WYE configuration when GDR is active, and from a WYE configuration to a DELTA configuration when GDR is not active. Shifting motor configuration to avoid GDR would allow the power tool 100 to run the motor 275 at full power in high load applications where the gate driver would otherwise reduce a PWM signal and performance of the motor 275. After the controller 200 determines that the motor configuration is to be changed, the motor controls the switching points 805, 810, 815 to either switch the motor from the DELTA configuration to the WYE configuration or from the WYE configuration to the DELTA configuration (STEP 1015). In some embodiments, the motor 275 is allowed to coast (e.g., all switches in the switching network 260 ON) for a predetermined amount of time (e.g., 600 µs) prior to changing the motor configuration to the DELTA configuration or the WYE configuration. The controller 200 then operates the power tool 100 and motor 275 with the modified motor configuration (STEP 1020).

Figure 10B:
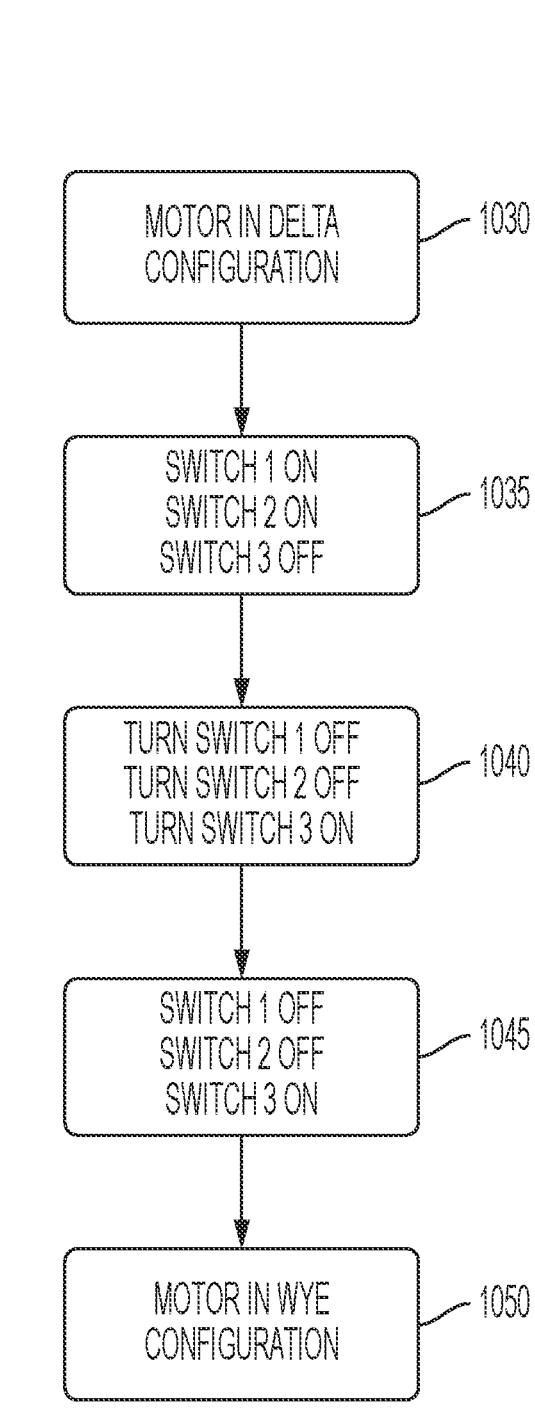
FIG. 10B is a process for changing a motor configuration, according to embodiments described herein.

FIG. 10B is a process 1025 for switching the circuit 800 of FIG. 8 from the DELTA configuration of circuit 900 to the WYE configuration of circuit 905. At STEP 1030, the power tool 100 is being operated by the controller 200 with the stator 340 in the DELTA configuration. In the DELTA configuration, the first switching point 805 is ON, the second switching point 810 is ON, and the third switching point 815 is OFF (STEP 1035). When the controller 200 switches from the DELTA configuration to the WYE configuration, the first switching point 805 is turned OFF, the second switching point 810 is turned OFF, and the third switching point 815 is turned ON (STEP 1040). The stator 340 is now in the WYE configuration and the first switching point 805 is OFF, the second switching point 810 is OFF, and the third switching point 815 is ON (STEP 1045). The controller 200 then operates the power tool 100 and the motor 275 in the WYE configuration (STEP 1050).

Figure 10C:
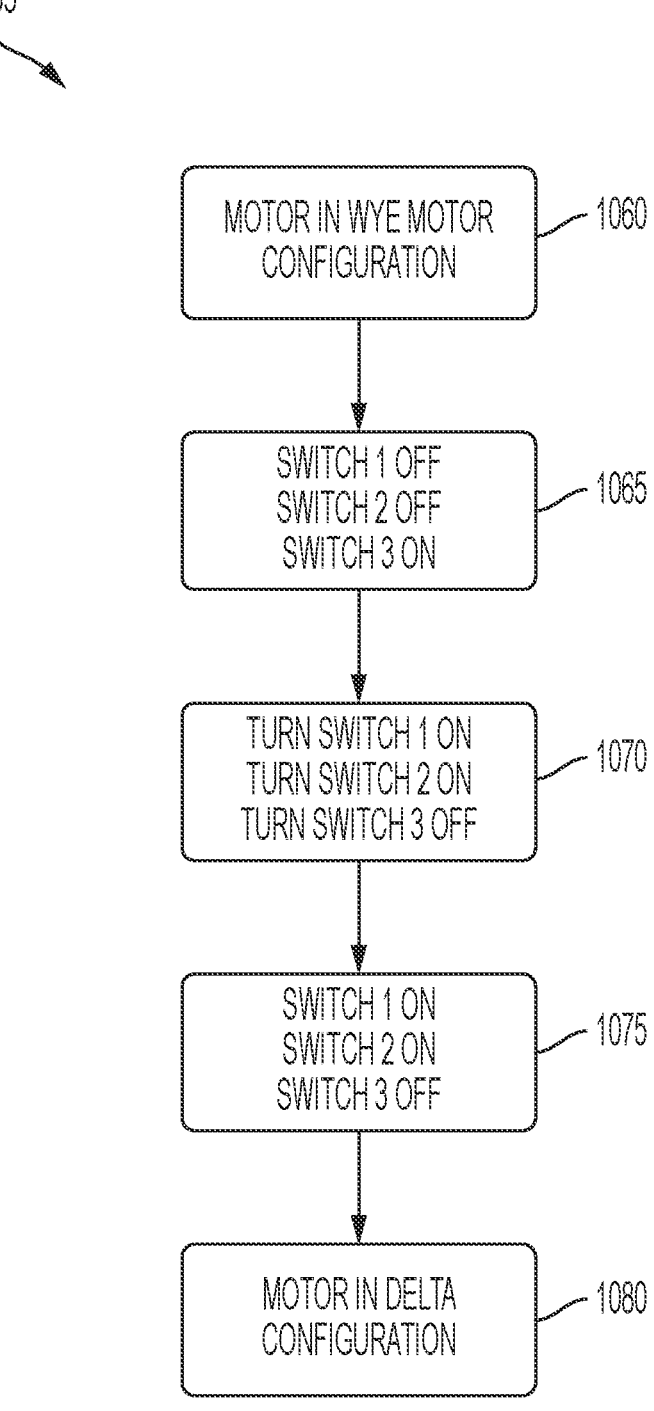
FIG. 10C is a process for changing a motor configuration, according to embodiments described herein.

FIG. 10C is a process 1055 for switching the circuit 800 of FIG. 8 from the WYE configuration of circuit 905 to the DELTA configuration of circuit 900. At STEP 1060, the power tool 100 is being operated by the controller 200 with the stator 340 in the WYE configuration. In the WYE configuration, the first switching point 805 is OFF, the second switching point 810 is OFF, and the third switching point 815 is ON (STEP 1065). When the controller 200 switches from the WYE configuration to the DELTA configuration, the first switching point 805 is turned ON, the second switching point 810 is turned ON, and the third switching point 815 is turned OFF (STEP 1070). The stator 340 is now in the DELTA configuration and the first switching point 805 is ON, the second switching point 810 is ON, and the third switching point 815 is OFF (STEP 1075). The controller 200 then operates the power tool 100 and the motor 275 in the DELTA configuration (STEP 1080).

Figure 11:
FIG. 11 illustrates a circuit for configuring a motor in a WYE or DELTA configuration.

FIG. 11 illustrates another circuit 1100 for switching between a DELTA configuration of a motor and a WYE configuration of a motor. In the circuit illustrated in FIG. 11, in the power tool 100 includes phase A, phase B, and phase C (but not the fourth phase D included in the circuit 800 of FIG. 8). As shown in FIG. 11, the circuit 1100 also includes a first switching point 1105, a second switching point 1110, a third switching point 1115, a fourth switching point 1120, and a fifth switching point 1125. The first switching point 1105 is between phase windings 410, 415 and the phase windings 400, 405. The second switching point 1110 is between the phase windings 400, 405 and the phase windings 410, 415. The third switching point 1115 is between phase windings 410, 415 and phase B. The fourth switching point 1120 is between phase C and the phase windings 420, 425. The fifth switching point 1125 is between the phase windings 420, 425 and the phase windings 400, 405. In some embodiments, each switching point includes one switch (e.g., a FET, a MOSFET, a solid-state relay, etc.). In other embodiments, each switching point includes more than one switch (e.g., two switches back-to-back to create four-quadrant switch implementation). Accordingly, in some embodiments, the circuit 1100 includes a total of ten additional switches (e.g., MOSFETs) when compared to a conventional three phase DC motor that is permanently configured in either a DELTA configuration or a WYE configuration. In some embodiments, five additional switches (e.g., relays) are used. The switches at the switching points 1105, 1110, 1115, 1120, 1125 are selectively controlled by the controller 200 to configure the stator 340 in either a DELTA configuration or a WYE configuration. The circuit 1100 uses fewer switches than conventional DELTA-WYE switching configurations, and keeps the neutral line attached to one of the three phases when not in the WYE configuration. Conventionally, the neutral line would be floating when not in the WYE configuration.

Figure 12A:
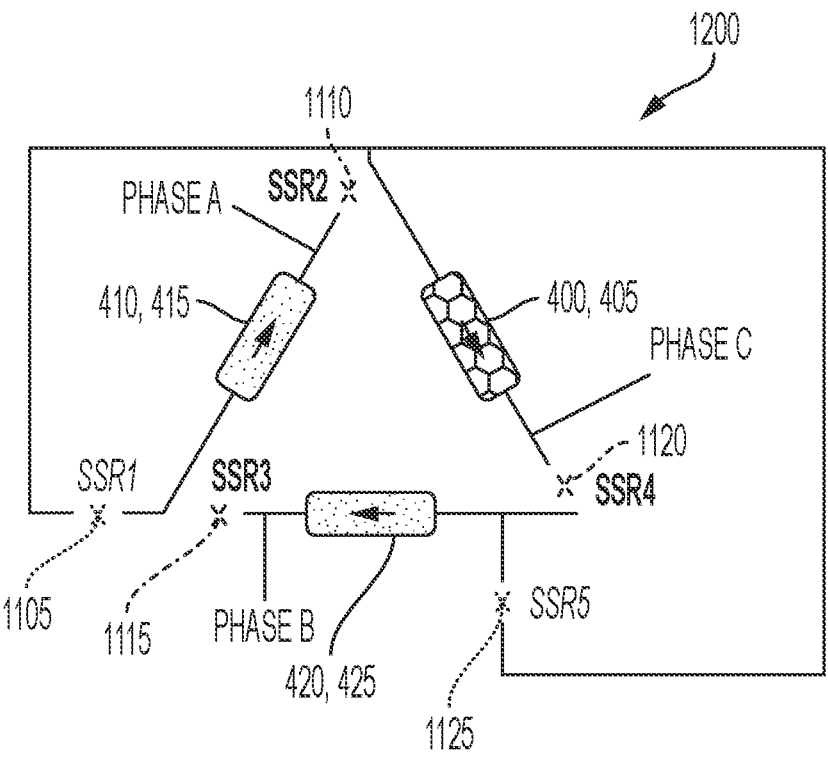
FIG. 12A illustrates a technique for configuring a motor in a DELTA configuration.

FIG. 12A illustrates a circuit 1200 for the stator 340 in a DELTA configuration of the circuit 1100 of FIG. 11. In the DELTA configuration, the first switching point 1105 and the fifth switching point 1125 are configured to be OFF (i.e., non-conducting state), and the second switching point 1110, the third switching point 1115, and the fourth switching point 1120 are configured to be ON (i.e., conducting state). As a result, the phase windings 400, 405 include the second switching point 1110 (and associated switches), the phase windings 410, 415 include the third switching point 1115 (and associated switches), the phase windings 420, 425 include the fourth switching point 1120 (and associated switches).

Figure 12B:
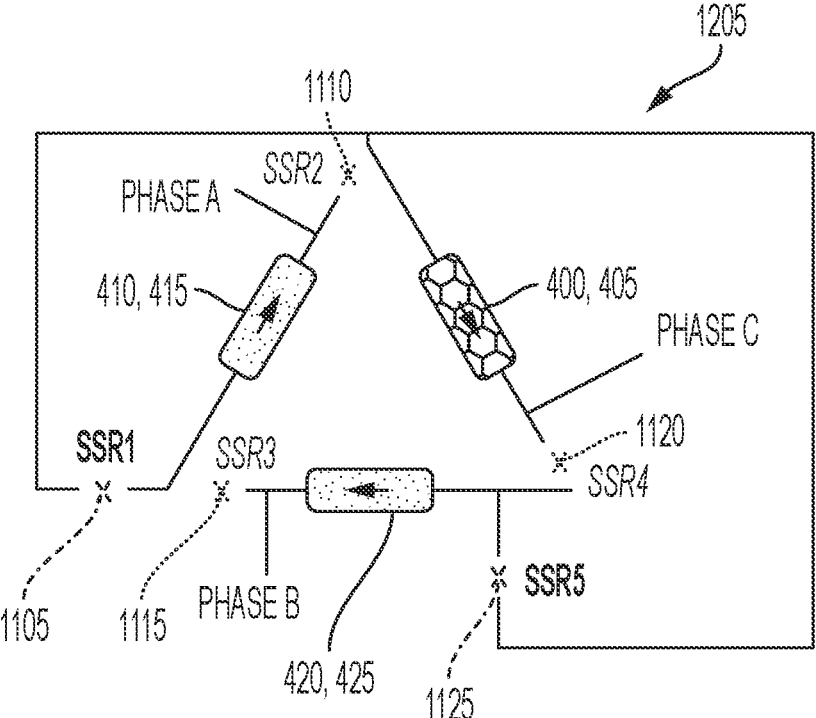
FIG. 12B illustrates a technique for configuring a motor in a WYE configuration.

FIG. 12B illustrates a circuit 1205 for the stator 340 in a WYE configuration of the circuit 1100 of FIG. 11. In the WYE configuration, the first switching point 1105 and the fifth switching point 1125 are configured to be ON (i.e., conducting state), and the second switching point 1110, the third switching point 1115, and the fourth switching point 1120 are configured to be OFF (i.e., non-conducting state). As a result, the phase windings 400, 405 include the first switching point 1105 (and associated switches) and the phase windings 420, 425 include the fifth switching point 1125 (and associated switches).

Figure 13A:
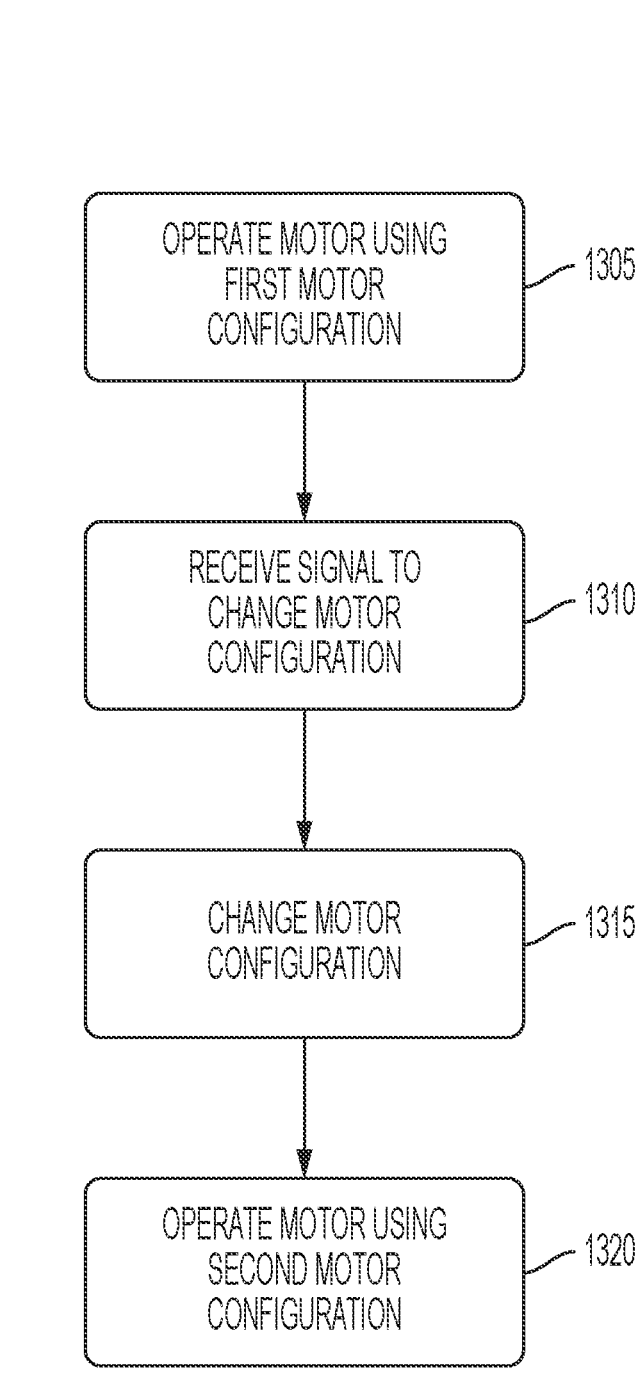
FIG. 13A is a process for changing a motor configuration, according to embodiments described herein.

FIG. 13A is a general process 1300 for switching the circuit 1100 of FIG. 11 between the DELTA configuration of circuit 1200 and the WYE configuration of circuit 1205, and vice versa. At STEP 1305, the power tool 100 is being operated by the controller 200 with the motor 275 having the stator 340 in a first motor configuration. Operation of the power tool 100 generally refers to the motor 275 rotating in order to produce a rotational output of the shaft 330. The rotational motion of the shaft 330 is then used to produce a desired output operation, which varies by the type of power tool 100 (e.g., a rotational output, a reciprocating output, a pulling output, etc.). At STEP 1310, the controller 200 receives a signal to change the configuration of the motor 275. In some embodiments, the signal is provided by a user through the user interface 245. For example, a user can select or adjust a shift point based on a particular application (e.g., wood, metal, embedded nail, etc.). In other embodiments, the signal is generated internally by the controller 200 based on a condition of the power tool 100 and/or motor 275. For example, the controller 200 can generate the signal to change motor configuration based on a speed of the motor, a torque of the motor, a current of the motor, a load point of the motor, a field weakening conduction angle of the motor, a type of battery pack connected to the power tool (e.g., based on the capacity of the battery pack), a state of charge of a battery pack (e.g., to optimize runtime over performance), grip strength above or equal to a grip strength threshold, a temperature (e.g., motor temperature) above or below or equal to a temperature threshold, etc. After the controller 200 determines that the motor configuration is to be changed, the motor controls the switching points 1105, 1110, 1115, 1120, 1125 to either switch the motor from the DELTA configuration to the WYE configuration or from the WYE configuration to the DELTA configuration (STEP 1315). In some embodiments, the motor 275 is allowed to coast (e.g., all switches in the switching network 260 OFF, pining one phase, etc.) for a predetermined amount of time (e.g., 600 µs) prior to changing the motor configuration to the DELTA configuration or the WYE configuration. The controller 200 then operates the power tool 100 and motor 275 with the modified motor configuration (STEP 1320).

Figure 13B:
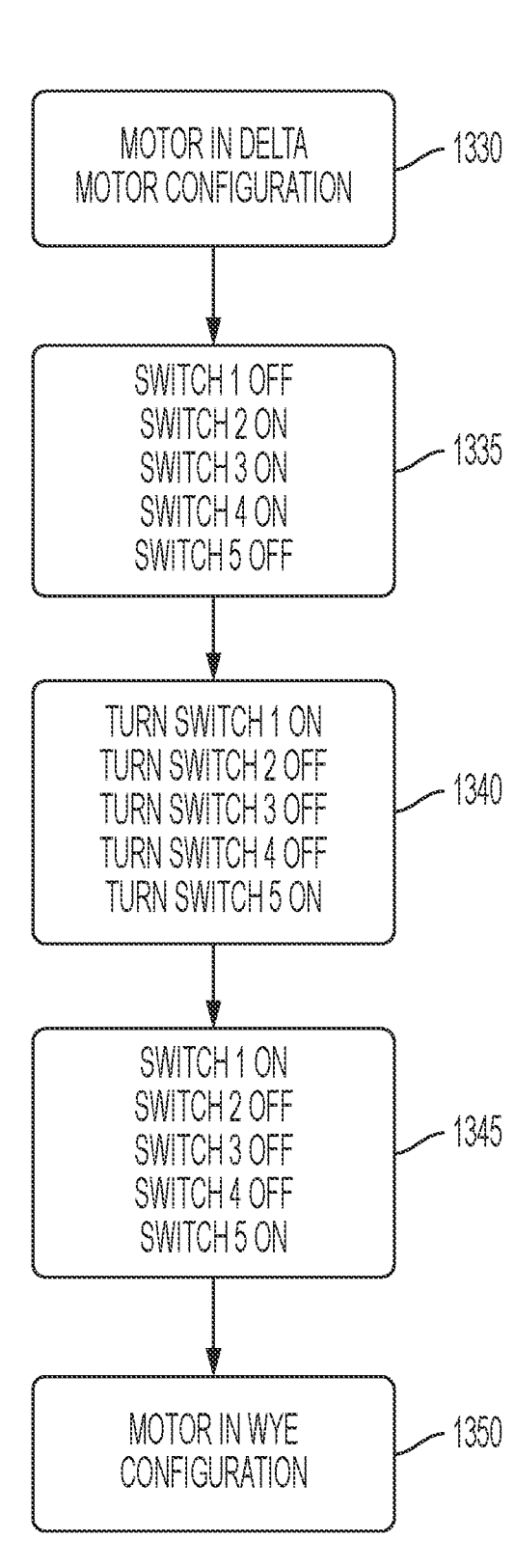
FIG. 13B is a process for changing a motor configuration, according to embodiments described herein.

FIG. 13B is a process 1325 for switching the circuit 1100 of FIG. 11 from the DELTA configuration of circuit 1200 to the WYE configuration of circuit 1205. At STEP 1330, the power tool 100 is being operated by the controller 200 with the stator 340 in the DELTA configuration. In the DELTA configuration, the first switching point 1105 is OFF, the second switching point 1110 is ON, the third switching point 1115 is ON, the fourth switching point 1120 is ON, and the fifth switching point 1125 is OFF (STEP 1335). When the controller 200 switches from the DELTA configuration to the WYE configuration, the first switching point 1105 is turned ON, the second switching point 1110 is turned OFF, the third switching point 1115 is turned OFF, the fourth switching point 1120 is turned OFF, and the fifth switching point 1125 is turned ON (STEP 1340). The stator 340 is now in the WYE configuration and the first switching point 1105 is ON, the second switching point 1110 is OFF, the third switching point 1115 is OFF, the fourth switching point 1120 is OFF, and the fifth switching point 1125 is ON (STEP 1345). The controller 200 then operates the power tool 100 and the motor 275 in the WYE configuration (STEP 1350).

Figure 13C:
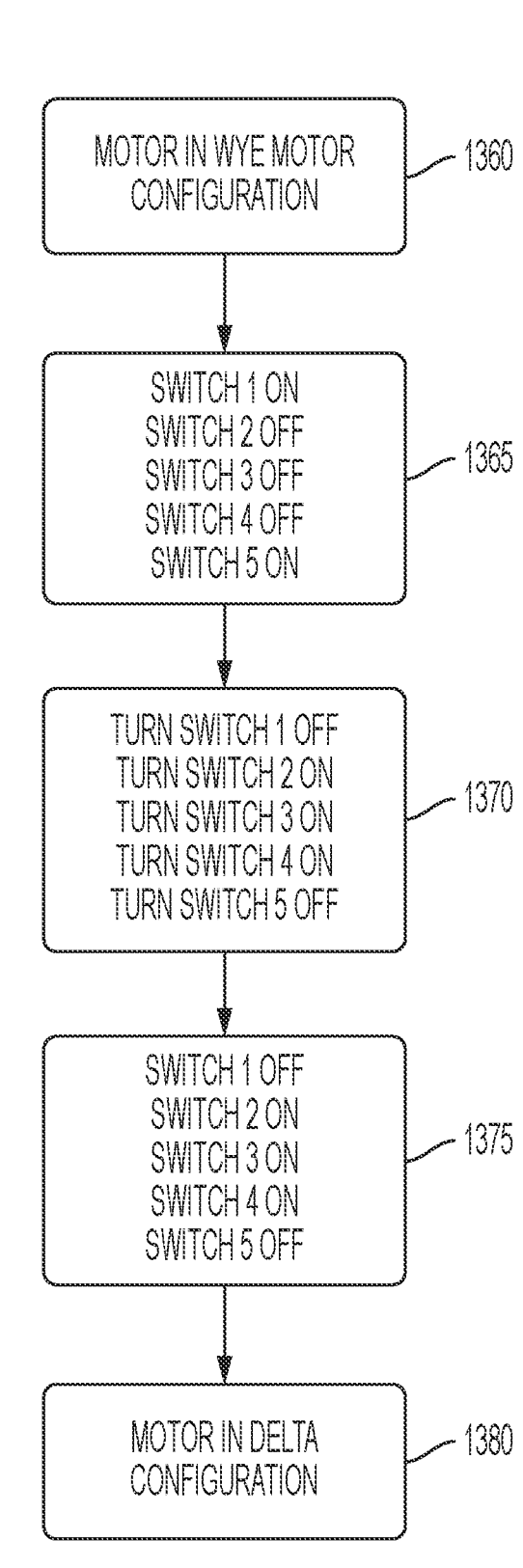
FIG. 13C is a process for changing a motor configuration, according to embodiments described herein.

FIG. 13C is a process 1355 for switching the circuit 1100 of FIG. 11 from the WYE configuration of circuit 1205 to the DELTA configuration of circuit 1200. At STEP 1360, power tool 100 is being operated by the controller 200 with the stator 340 in the WYE configuration. In the WYE configuration, the first switching point 1105 is ON, the second switching point 1110 is OFF, the third switching point 1115 is OFF, the fourth switching point 1120 is OFF, and the fifth switching point 1125 is ON (STEP 1365). When the controller 200 switches from the WYE configuration to the DELTA configuration, the first switching point 1105 is turned OFF, the second switching point 1110 is turned ON, the third switching point 1115 is turned ON, the fourth switching point 1120 is turned ON, and the fifth switching point 1125 is turned OFF (STEP 1370). The stator 340 is now in the DELTA configuration and the first switching point 1105 is OFF, the second switching point 1110 is ON, the third switching point 1115 is ON, the fourth switching point 1120 is ON, and the fifth switching point 1125 is OFF (STEP 1375). The controller 200 then operates the power tool 100 and the motor 275 in the DELTA configuration (STEP 1380).

Figure 14B:
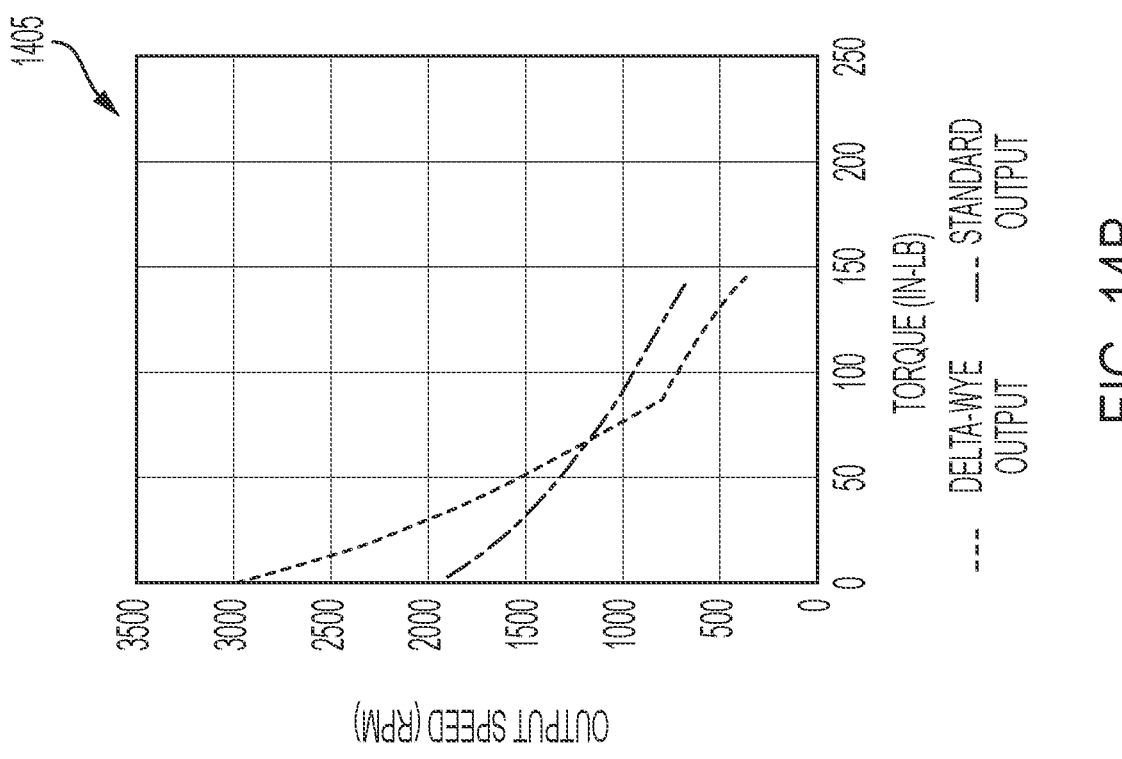
FIG. 14B illustrates a torque-speed curve for a DELTA-WYE motor configuration.
Figure 14A:
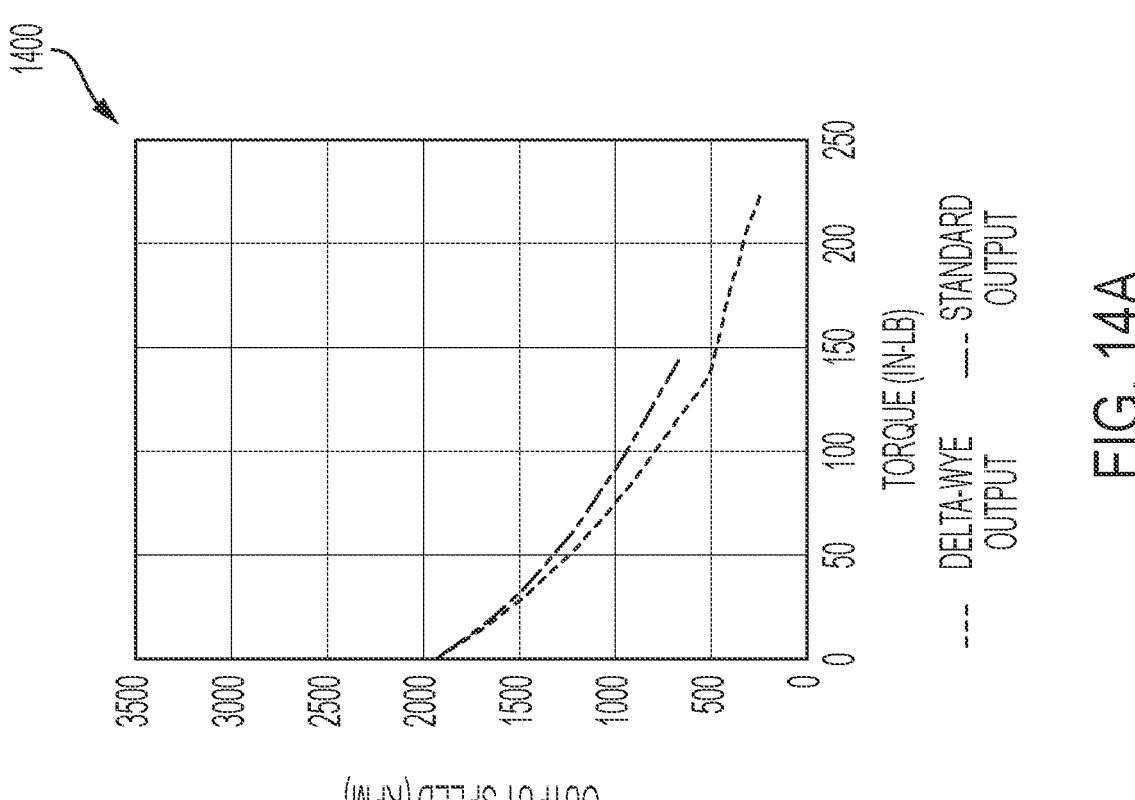
FIG. 14A illustrates a torque-speed curve for a DELTA-WYE motor configuration.
Figure 14C:
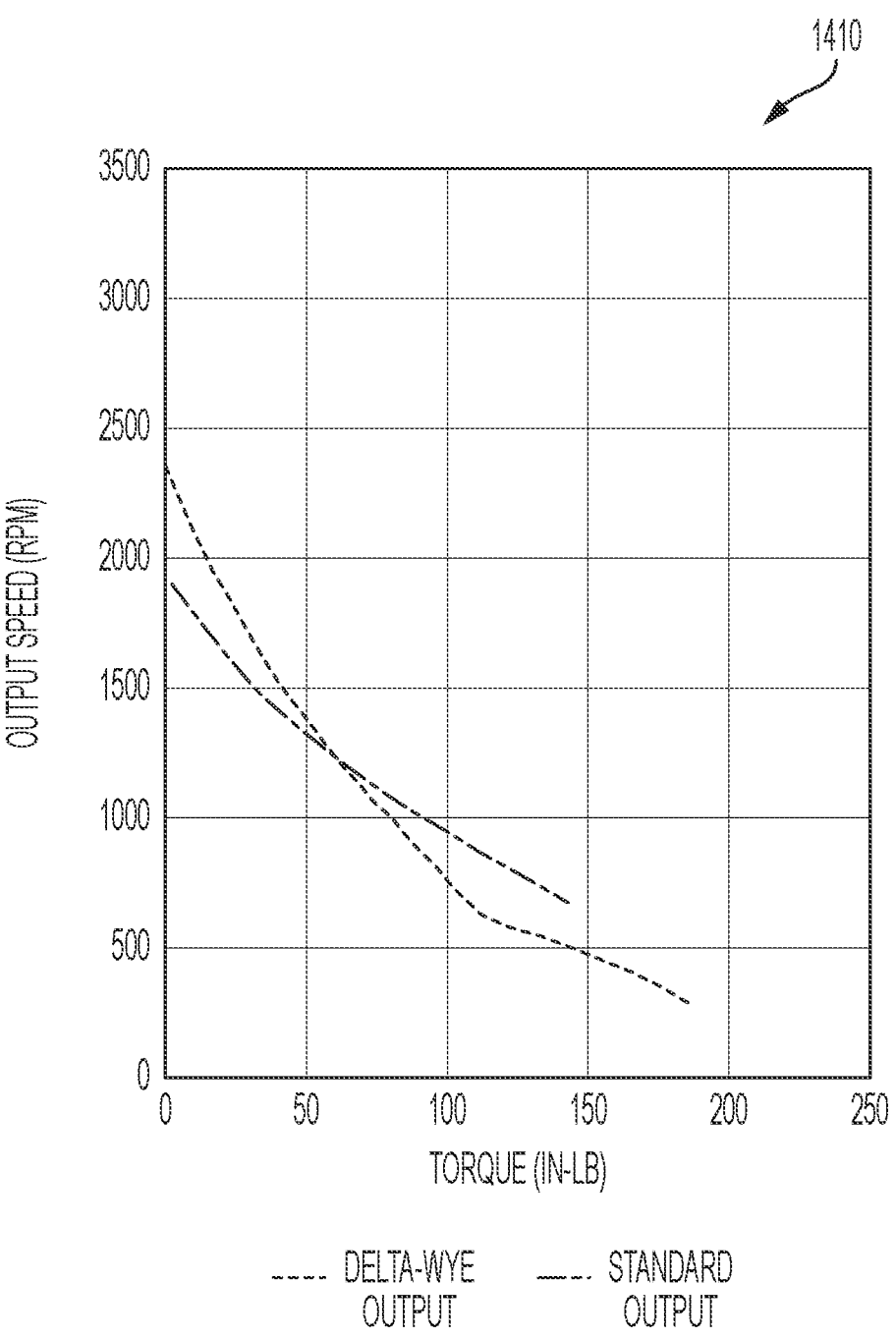
FIG. 14C illustrates a torque-speed curve for a DELTA-WYE motor configuration.

The power tool 100 is configured to control its operation with the motor 275 and stator 340 configured in either the DELTA configuration or the WYE configuration using the various motor configuration switching circuits described herein. However, the point at which the controller 200 switches from the DELTA configuration to the WYE configuration, or the WYE configuration to the DELTA configuration, is selected based on a variety of factors. For example, the point at which the motor 275 switches configurations is dependent upon the particular type of performance that is desired from the motor 275. FIGS. 14A, 14B, and 14C illustrate various torque-speed curves for the motor 275. The torque-speed curves shown in FIGS. 14A, 14B, and 14C all have varied output characteristics, and each is illustrated with respect to a standard motor output (i.e., and output for a motor that does not switch between DELTA and WYE configurations). The torque speed curves can be modified based on, for example, transmission gear ratios that are used to reduce the output speeds from the motor 275. FIG. 14A illustrates a torque-speed curve 1400 that is optimized for increased torque. FIG. 14B illustrates a torque-speed curve 1405 that is optimized for increased speed. FIG. 14C illustrates a torque-speed curve 1410 that is balanced between increased speed and increased torque.

After the properties or characteristics for the desired torque-speed curve for the power tool 100 is selected, the point at which the motor 275 is switched between DELTA and WYE configurations is selected. In some embodiments, the shift or transition point for transitioning between DELTA and WYE configurations is selected to be a point at or near the point (e.g., torque in N-M or In-lbs) when the DELTA motor configuration torque-speed curve intersects the WYE motor configuration torque-speed curve. However, the amount of current drawn from the power tool 100's power source (e.g., battery pack 150) when transitioning between DELTA and WYE configurations can potentially overload the power source. For example, a very high output current during the transition can potentially persist for a greater time duration than the power source can sustain. If this occurs, the power source can shut down or otherwise be rendered inoperable. If, however, the transition point for transitioning between DELTA and WYE configurations is selected to be a lower torque point along the torque-speed curve (i.e., prior to the point when the DELTA and WYE torque-speed curves intersect), the amount of current that is being drawn from the power source is lower. As a result, the potential for damaging or rendering the power source inoperable is reduced.

Figure 15:
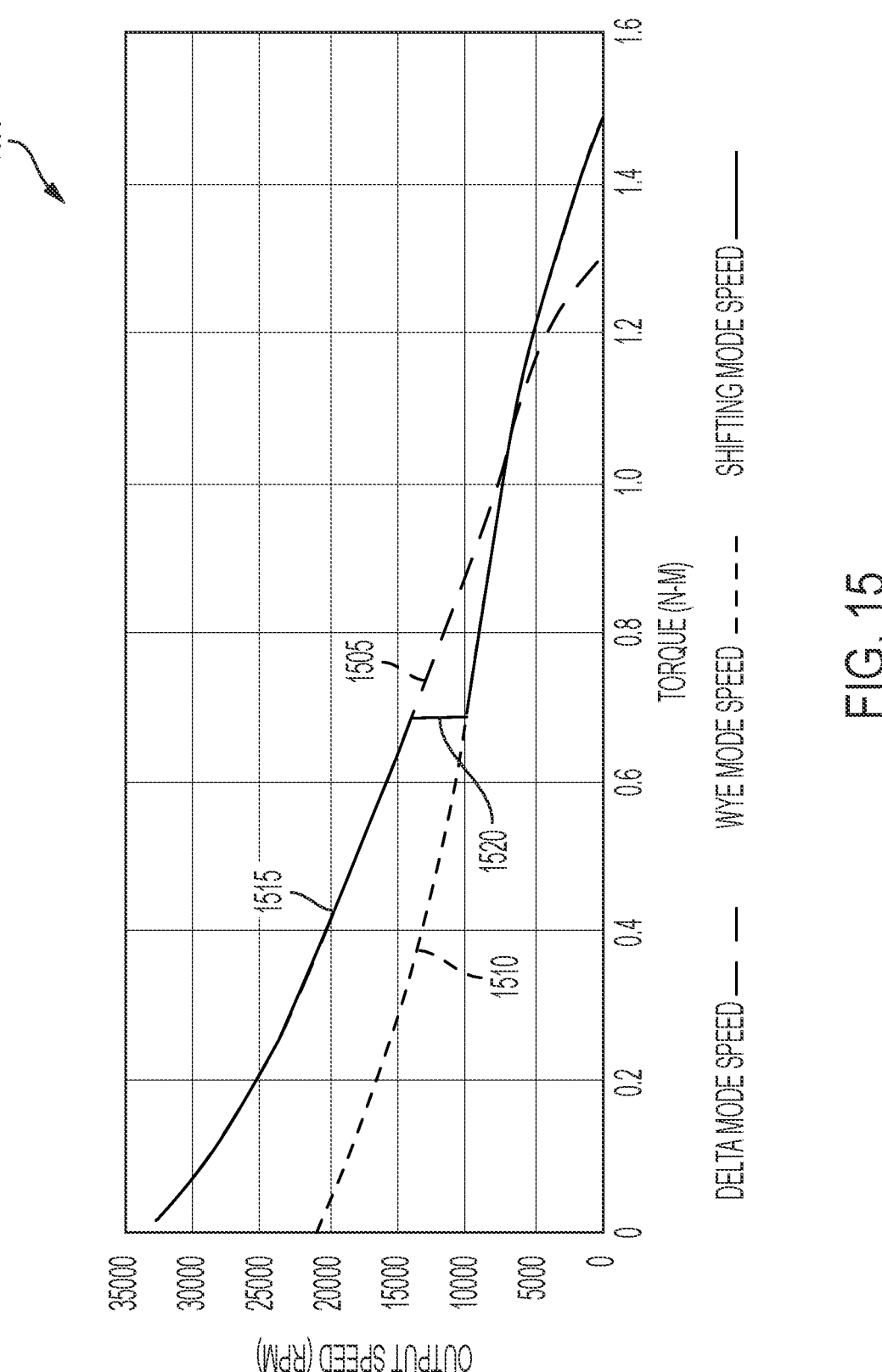
FIG. 15 illustrates a torque-speed curve for a DELTA-WYE motor configuration and switching between a DELTA configuration and a WYE configuration.

FIG. 15 illustrates a graph 1500 of torque-speed curves that includes a DELTA torque-speed curve 1505, a WYE torque-speed curve 1510, and a shifting mode torque-speed curve 1515. In the shifting mode, the configuration of the motor is shifted from the DELTA configuration to the WYE configuration or from the WYE configuration to the DELTA configuration. Generally, shifting from the DELTA configuration to the WYE configuration occurs during increased loading or circumstances where increased torque is desired. In some embodiments, the transition point is selected to be between 50% and 100% of the torque value at which the DELTA torque-speed curve and the WYE torque-speed curve intersect. In some embodiments, the transition point is selected to be between 50% and 75% of the torque value at which the DELTA torque-speed curve and the WYE torque-speed curve intersect. In some embodiments, the transition point is selected to be between 75% and 100% of the torque value at which the DELTA torque-speed curve and the WYE torque-speed curve intersect. In some embodiments, the transition point is selected to be between 25% and 75% of the torque value at which the DELTA torque-speed curve and the WYE torque-speed curve intersect.

In FIG. 15, the shift between the DELTA configuration and the WYE configuration occurs at approximately 0.7 N-M. In other embodiments, a different shift point torque is selected. for the embodiment of FIG. 15, the shift point at which the motor 275 is switched from the DELTA configuration to the WYE configuration, or from the WYE configuration to the DELTA configuration, is the same. In some embodiments, a speed/torque trade-off of approximately 1.73 ($\sqrt{3}$) is achieved (i.e., torque increase or speed increase dependent upon transition is 1.73 times that prior to transition). Although the shift points for shifting between the DELTA configuration and the WYE configuration are described with respect to torque values, the shift points could similarly be described with respect to speed values. In some embodiments, field weakening may be used to smooth and/or reduce the shift step 1520 when shifting from DELTA configuration to the WYE configuration.

The point at which the motor 275 is transitioned between DELTA and WYE configurations can also depend on the rotational position of the rotor 300 (e.g., as detected by Hall effect rotor position sensors). Testing has demonstrated that transient current spikes when switching between the DELTA configuration and the WYE configuration are heavily dependent upon the rotational position of the rotor 300. As a result, in some embodiments, the motor 275 is only permitted to transition between the DELTA configuration and the WYE configuration when the rotor 300 is in a particular rotational position. For example, a predetermined window for transitioning between the DELTA configuration and the WYE configuration is selected. The window can correspond to a particular range of rotational positions for the rotor 300 (e.g., a 30° window, a 60° window, a 90° window, etc.). When the rotor 300 is within the transition window, the motor 275 is permitted to transition between the DELTA configuration and the WYE configuration. When the rotor 300 is outside of the transition window, the motor 275 is prevented from transitioning between the DELTA configuration and the WYE configuration.

In some embodiments, the timing of the control of the switches to switch from the DELTA configuration to the WYE configuration is also controlled by the controller 200 to reduce transient current spikes experienced during the transition. For example, in some embodiments, the switches for a new stator configuration are turned ON (i.e., closed) before the switches for the old stator configuration are turned OFF (i.e., opened). By closing the switches necessary to make the new stator configuration prior to opening the switches used for the previous stator configuration, transient current spikes are reduced. In some embodiments, improved braking of the motor 275 is also achieved by turning on all of the switches used for connecting the stator 340 in the DELTA or WYE configurations.

Figure 16:
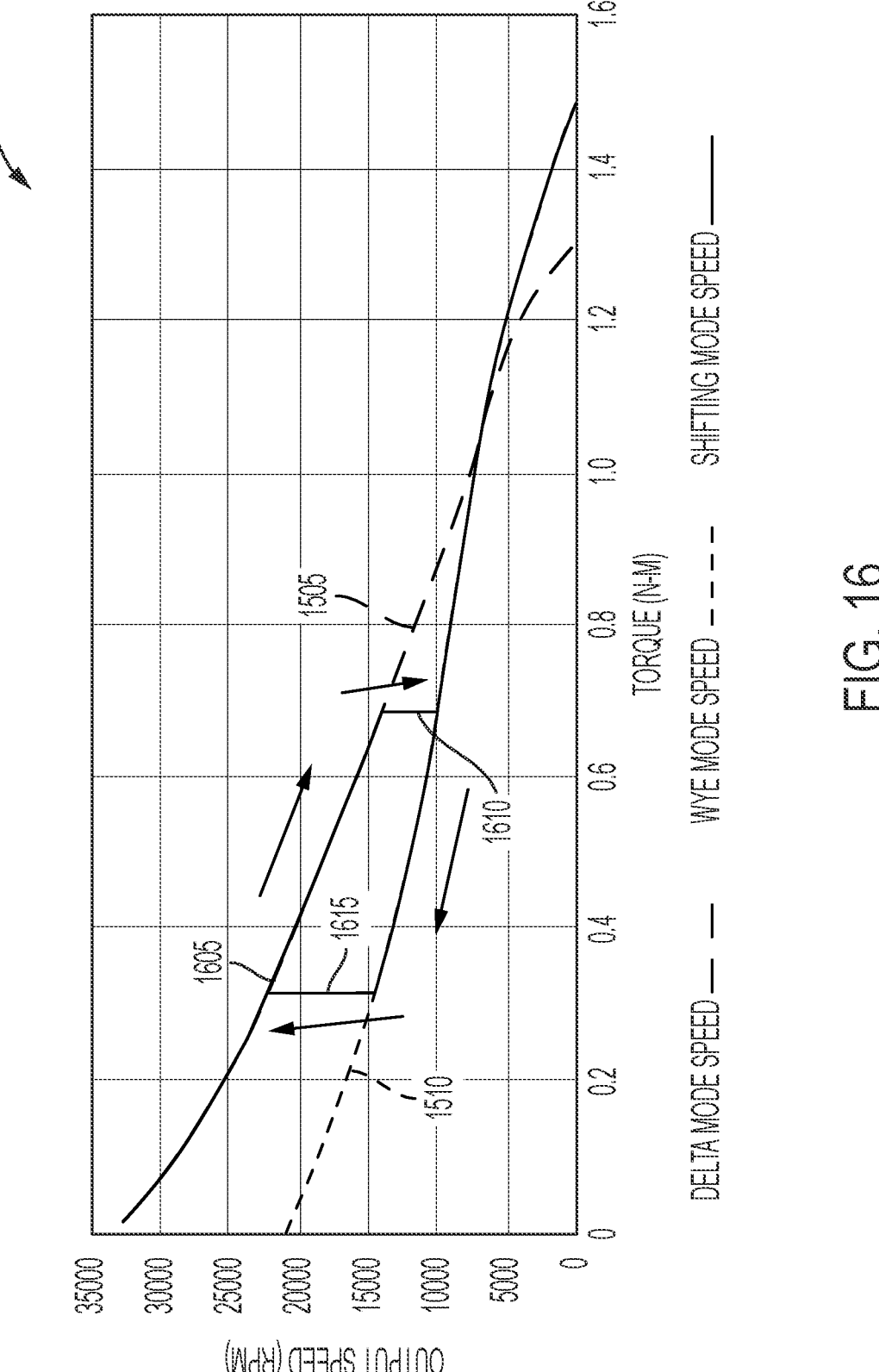
FIG. 16 illustrates a torque-speed curve for a DELTA-WYE motor configuration and switching between a DELTA configuration and a WYE configuration.

FIG. 16 illustrates a graph 1600 of torque-speed curves that includes the DELTA torque-speed curve 1505, the WYE torque-speed curve 1510, and a shifting mode torque-speed curve 1605. In the shifting mode, the configuration of the motor is shifted from the DELTA configuration to the WYE configuration or from the WYE configuration to the DELTA configuration. However, the shifting mode torque-speed curve 1605 introduces hysteresis into the transition between the DELTA configuration and the WYE configuration. Specifically, the shifting mode torque-speed curve includes two transition points. A first transition point 1610 corresponds to a shift from the DELTA configuration to the WYE configuration. A second transition point 1615 corresponds to a shift from the WYE configuration to the DELTA configuration. The first transition point 1610 corresponds to a higher torque value than the second transition point 1615. As a result, in the illustrated embodiment, the motor 275 transitions from the DELTA configuration to the WYE configuration at a higher torque value than the torque value at which the motor 275 transitions from the WYE configuration to the DELTA configuration. In other embodiments, the motor 275 transitions from the DELTA configuration to the WYE configuration at a lower torque value than the torque value at which the motor 275 transitions from the WYE configuration to the DELTA configuration.

Figure 17:
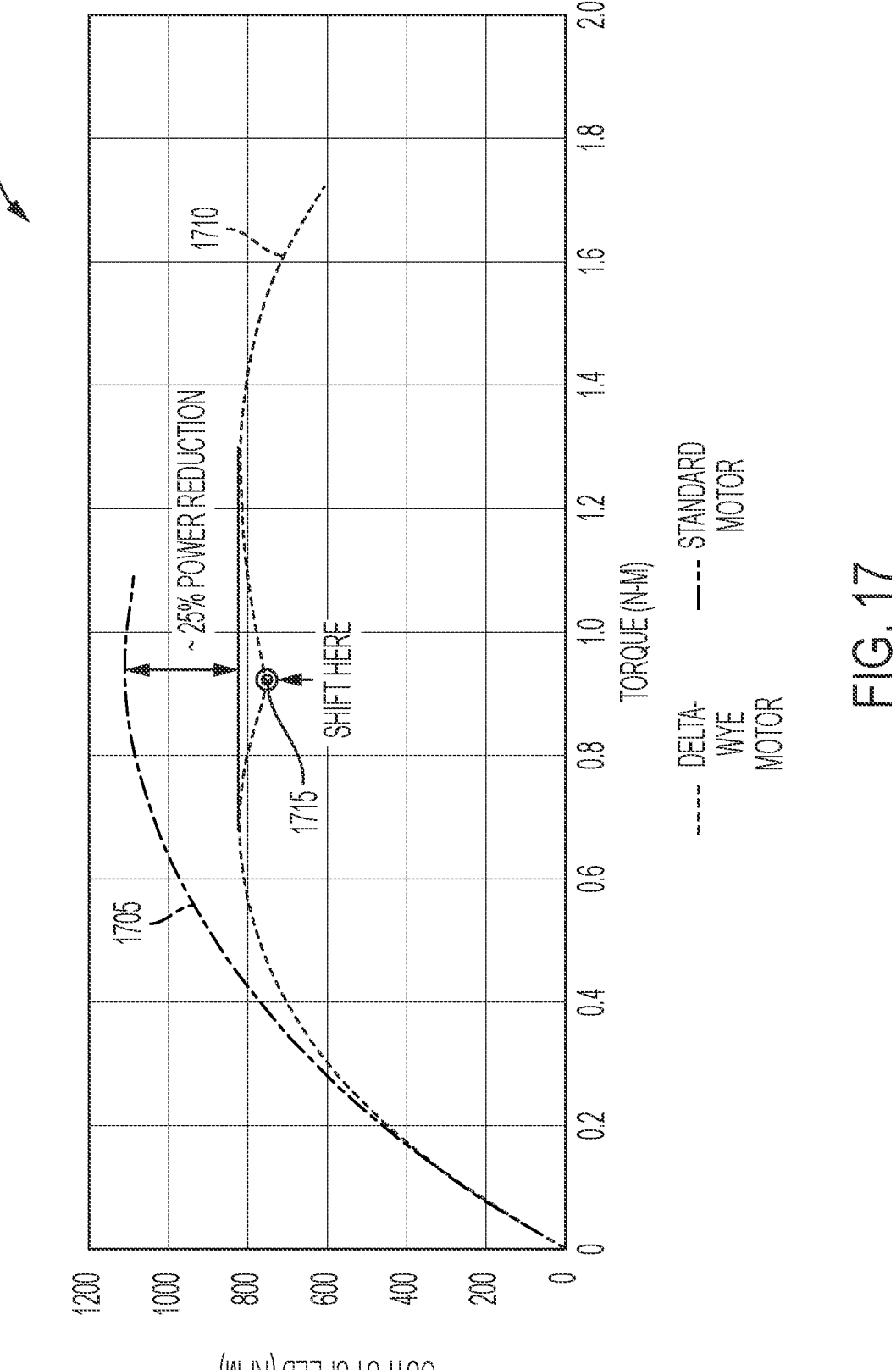
FIG. 17 illustrates a torque-power curve for a DELTA-WYE motor configuration.

FIG. 17 illustrates one of the consequences of shifting between the DELTA configuration and the WYE configuration. Specifically, FIG. 17 illustrates a graph 1700 that includes a standard motor torque-power curve 1705 and a DELTA-WYE torque-power curve 1710. A shift point 1715 corresponds to the point at which the motor 275 switches between the DELTA configuration and the WYE configuration. As a consequence of shift between the DELTA configuration and the WYE configuration smoothing, the output power of the power tool 100 is reduced by approximately 25% at the shift point 1715. However, while output power is reduced, the power tool 100 experiences a flatter power curve over a wide range of torque values. In some embodiments, the motor 275 may not be controlled using PWM signals. In such embodiments, a step function for both speed and power are implemented when transitioning between the DELTA configuration and the WYE configuration. In some embodiments, the power tool 100 is operated at full power up to the shift point and a step function transition occurs. The abruptness of the shift is configured to alert a user of the shift occurring and that an overload condition is approaching (e.g., for a chainsaw).

The switching electronics used to shift between the DELTA configuration and the WYE configuration have the potential to fail. Should a failure to shift between the DELTA configuration and the WYE configuration occur, the motor 275 may be placed in a "limp mode" that keeps the motor in a single configuration. For example, if the motor 275 fails to transition from the WYE configuration to the DELTA configuration, the motor 275 remains in the WYE configuration. Alternatively, if the motor 275 fails to transition from the DELTA configuration to the WYE configuration, the motor 275 remains in the DELTA configuration. In some embodiments, the failure could also be tested for at startup and the power tool 100 can be operated in the limp mode from the outset (e.g., without attempting the transition).

Figure 18B:
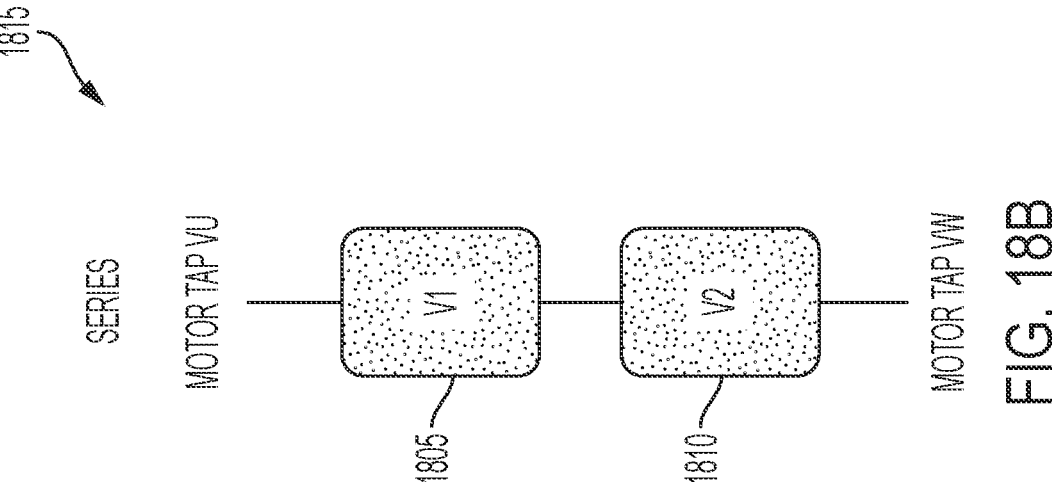
FIG. 18B illustrates a motor stator pole in a series configuration.
Figure 18A:
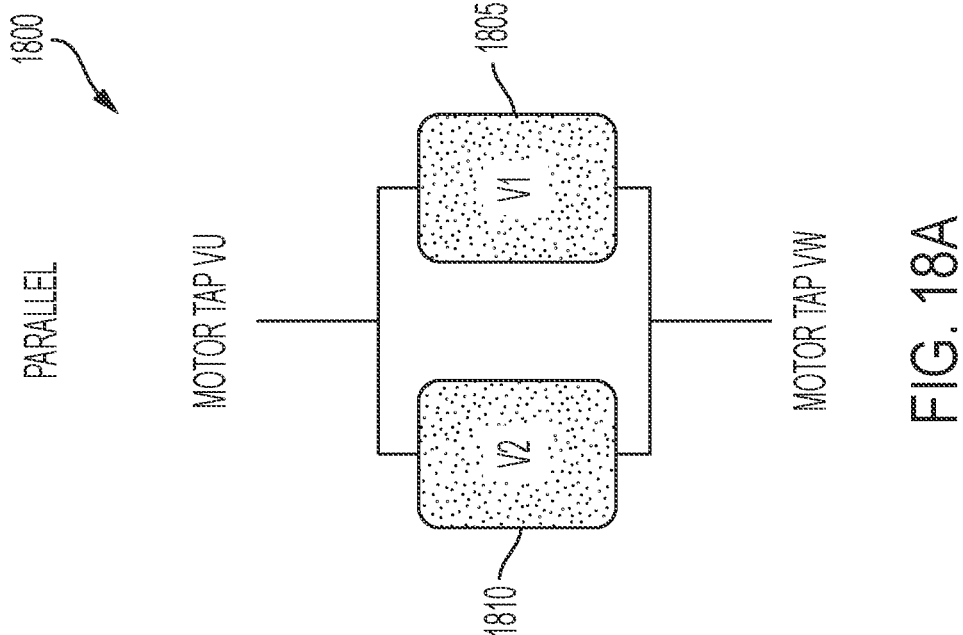
FIG. 18A illustrates a motor stator pole in a parallel configuration.

In addition to shifting the motor 275 between the DELTA configuration and the WYE configuration, the motor 275 can also be controlled to shift the stator phase windings between a PARALLEL configuration and a SERIES configuration. FIG. 18A illustrates a single stator motor phase 1800 that includes a first phase winding 1805 and a second phase winding 1810. In FIG. 18A, the first phase winding 1805 and the second phase winding 1810 are connected in PARALLEL with one another. FIG. 18B illustrates a single stator motor phase 1815 that includes the first phase winding 1805 and the second phase winding 1810. In FIG. 18B, the first phase winding 1805 and the second phase winding 1810 are connected in SERIES with one another.

Figure 19:
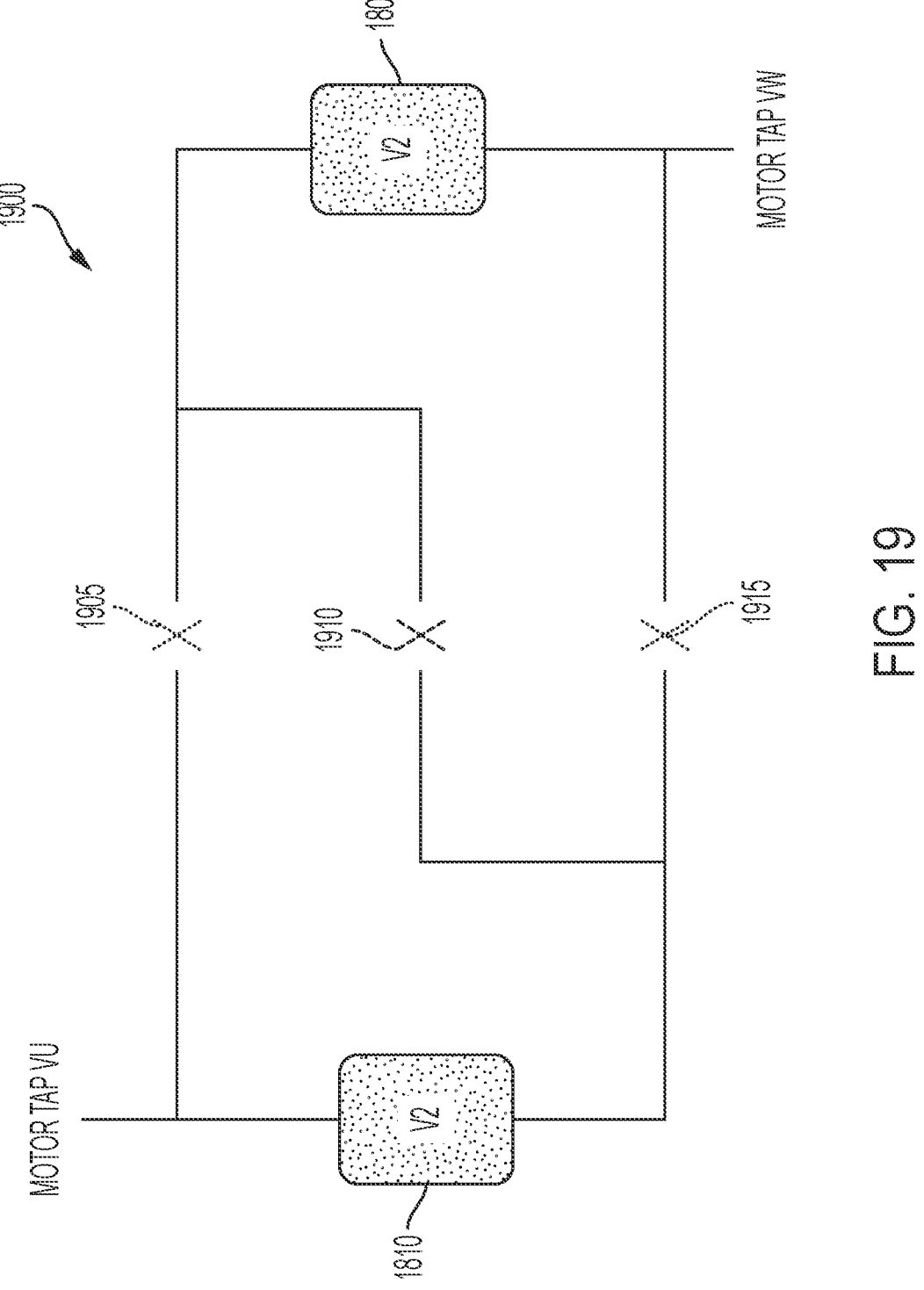
FIG. 19 illustrates a circuit for switching motor stator pole between a series configuration and a parallel configuration.

FIG. 19 illustrates a circuit 1900 for shifting a stator motor phase between a PARALLEL phase winding connection and a SERIES phase winding connection. In the illustrated embodiment, the first phase winding 1805 and the second phase winding 1810 are connected between a motor tap for the V-U phases and a motor tap for the V-W phases. The circuit 1900 includes a first switching point 1905, a second switching point 1910, and a third switching point 1915. In some embodiments, each switching point includes one switch (e.g., a FET, a MOSFET, a solid-state relay, etc.) for a total of nine switches (i.e., three per phase) for shifting the stator motor phase between the PARALLEL phase winding connection and the SERIES phase winding connection. In other embodiments, each switching point includes more than one switch (e.g., two switches back-to-back to create four-quadrant switch implementation). Accordingly, in some embodiments, the circuit 1900 includes a total of six additional switches per phase when compared to a conventional motor phase that is permanently configured in either a PARALLEL configuration or a SERIES configuration. The switches at the switching points 1905, 1910, 1915 are selectively controlled by the controller 200 to configure the first phase winding 1805 and the second phase winding 1810 in either a PARALLEL configuration or a SERIES configuration. Therefore, in some embodiments, a three phase motor will include a total of eighteen additional switches more than a conventional motor phase that is permanently configured in either a PARALLEL configuration or a SERIES configuration. In some embodiments, a speed/torque trade-off of approximately 2.0 is achieved by switching between the SERIES and PARALLEL stator phase configurations.

Figure 20:
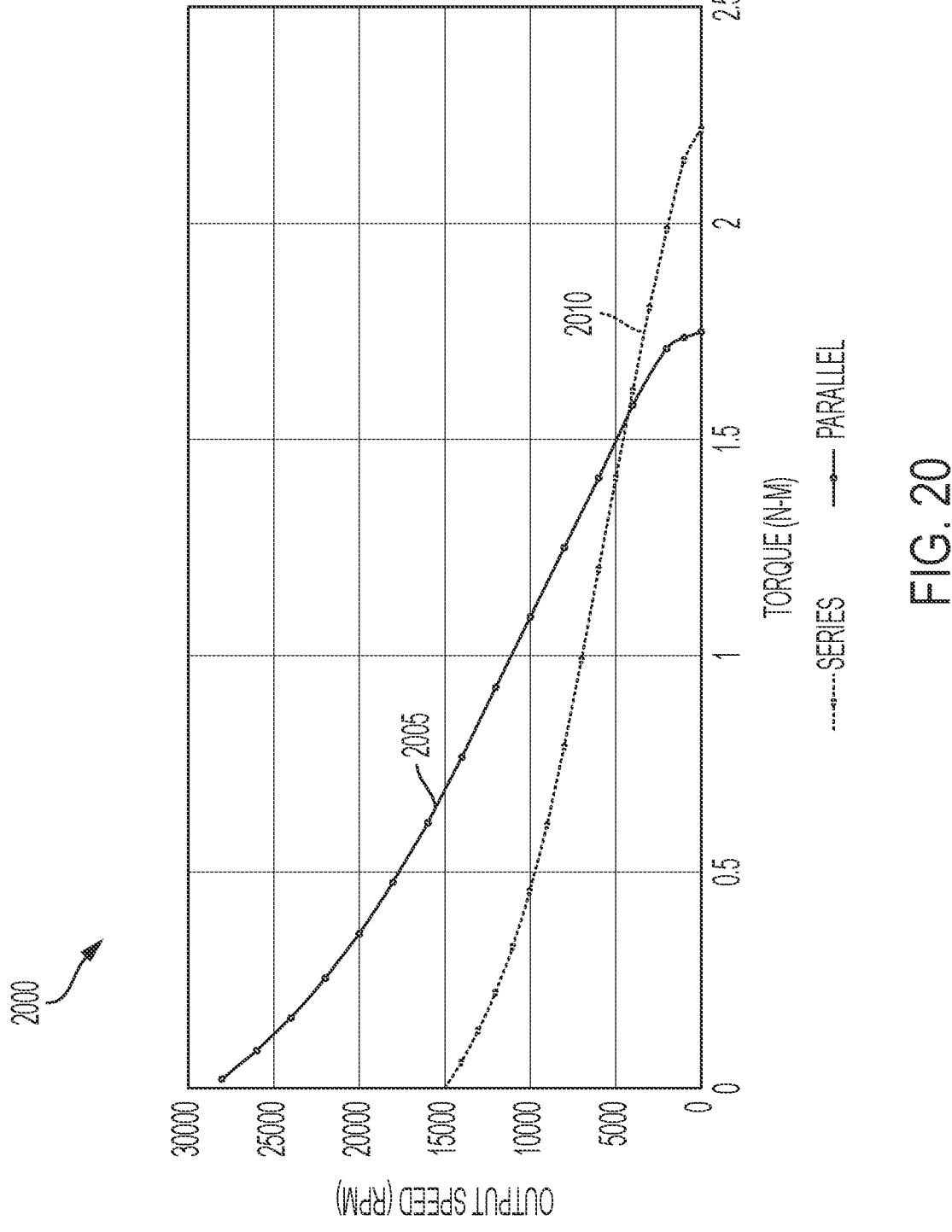
FIG. 20 illustrates torque-speed curves for stator windings in PARALLEL and SERIES connection configurations.

FIG. 20 illustrates a graph 2000 of torque-speed curves for a PARALLEL configured stator windings and a SERIES configured stator windings. The torque-speed curve 2005 for the PARALLEL configured stator windings demonstrates a higher output speed value in rotations per minute ("RPM") in a low or no torque situation when compared to a SERIES configured motor. However, the PARALLEL configured stator windings produce less output torque when compared to SERIES configured stator windings in a low speed situation. Conversely, the torque-speed curve 2010 for SERIES configured stator windings demonstrates lower output speed in RPM in a low torque or no torque situation when compared to a PARALLEL configured stator windings. However, the SERIES configured stator windings produce more torque when compared to PARALLEL configured stator windings in a low speed situation.

Figure 21:
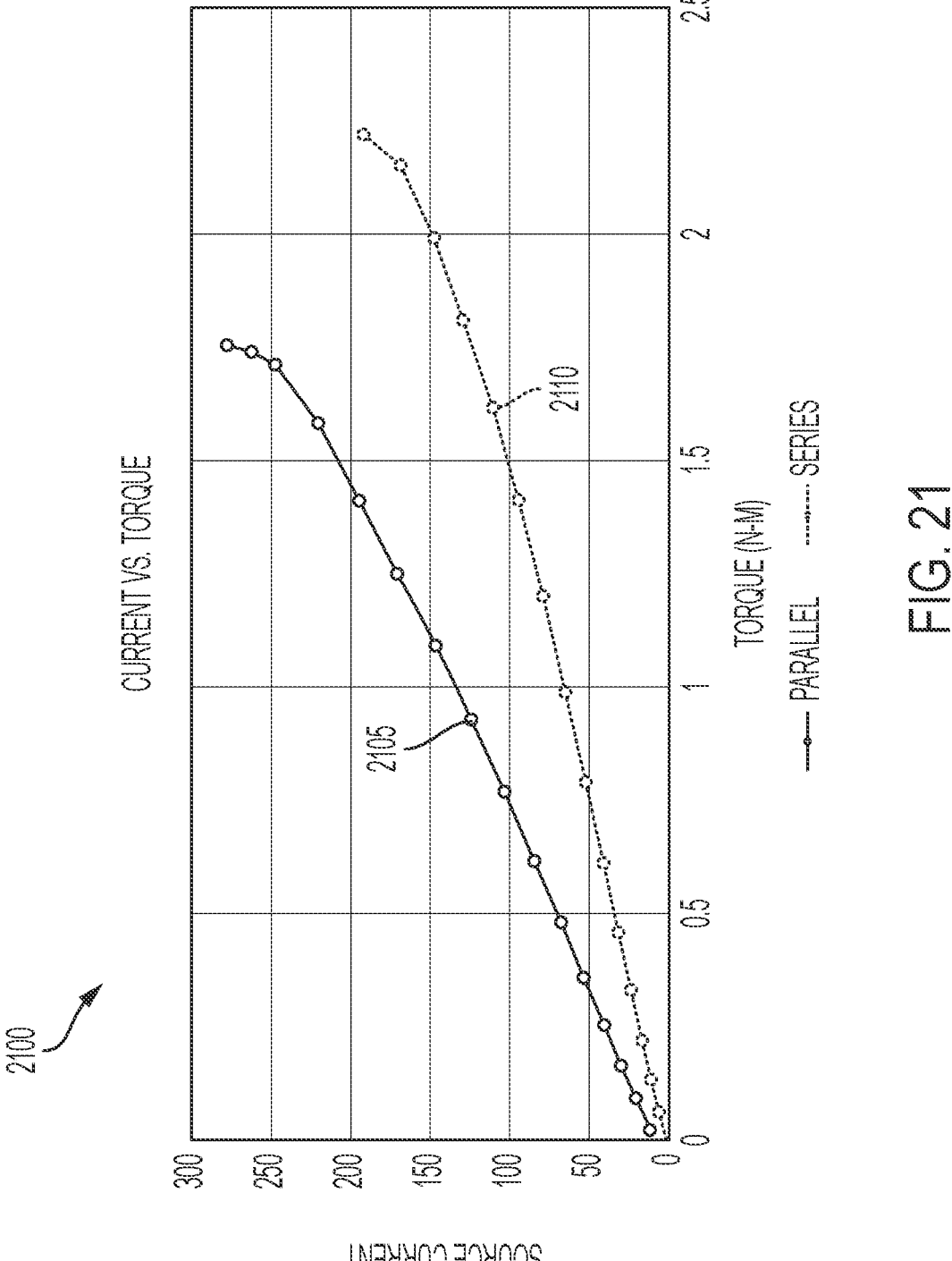
FIG. 21 illustrates torque-current curves for stator windings in PARALLEL and SERIES connection configurations.

FIG. 21 illustrates a graph 2100 of torque-current curves for PARALLEL configured stator windings and SERIES configured stator windings. The torque-current curve 2105 for the PARALLEL configured motor demonstrates that the PARALLEL configured stator windings generally draw higher currents when compared to the torque-current curve 2110 for the SERIES configured stator windings. This difference in source current is the result of an approximately four times (4×) increase in motor resistance in the SERIES configuration versus the PARALLEL configuration. Although the motor resistance change of 4× occurs, the overall system resistance only increases by approximately 50% when switching from the PARALLEL configuration to the SERIES configuration.

Because the PARALLEL configured stator windings and the SERIES configured stator windings have different operational properties or characteristics, it would be advantageous to be able to switch between PARALLEL configured stator windings and SERIES configured stator windings in order to take advantage of the strengths of each motor configuration. Specifically, it would be advantageous to be able to take advantage of the increased speed of the PARALLEL configuration and the increased torque of the SERIES configuration.

Figure 22A:
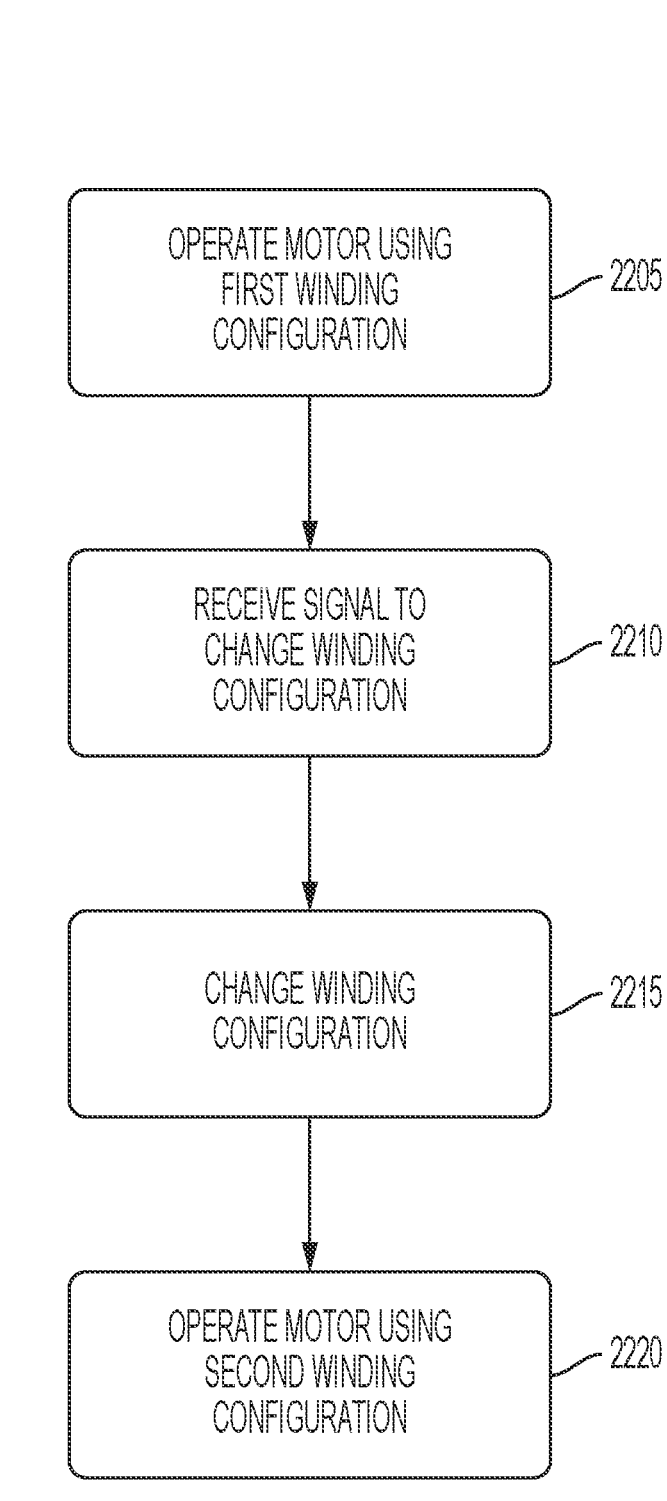
FIG. 22A is a process for changing a motor configuration, according to embodiments described herein.

FIG. 22A is a general process 2200 for switching the circuit 1900 of FIG. 19 between a PARALLEL configuration for a motor phase and a series configuration for a motor phase, and vice versa. At STEP 2205, the power tool 100 is being operated by the controller 200 with the motor 275 having the stator 340 in a first stator winding configuration. Operation of the power tool 100 generally refers to the motor 275 rotating in order to produce a rotational output of the shaft 330. The rotational motion of the shaft 330 is then used to produce a desired output operation, which varies by the type of power tool 100 (e.g., a rotational output, a recipro-cating output, a pulling output, etc.). At STEP 2210, the controller 200 receives a signal to change the configuration of the motor 275. In some embodiments, the signal is provided by a user through the user interface 245. In other embodiments, the signal is generated internally by the controller 200 based on a condition of the power tool 100 and/or motor 275. For example, the controller 200 can generate the signal to change motor configuration based on a speed of the motor, a torque of the motor, a current of the motor, a load of the motor, a field weakening conduction angle of the motor, etc. After the controller 200 determines that the motor configuration is to be changed, the motor controls the switching points 1905, 1910, 1915 to either switch the stator winding from the PARALLEL configura-tion to the SERIES configuration or from the SERIES configuration to the PARALLEL configuration (STEP 2215). In some embodiments, the motor 275 is allowed to coast (e.g., all switches in the switching network 260 ON) for a predetermined amount of time (e.g., 600 μs) prior to changing the stator winding configuration to the PARAL-LEL configuration or the SERIES configuration. The con-troller 200 then operates the power tool 100 and motor 275 with the modified stator winding configuration (STEP 2220).

Figure 22B:
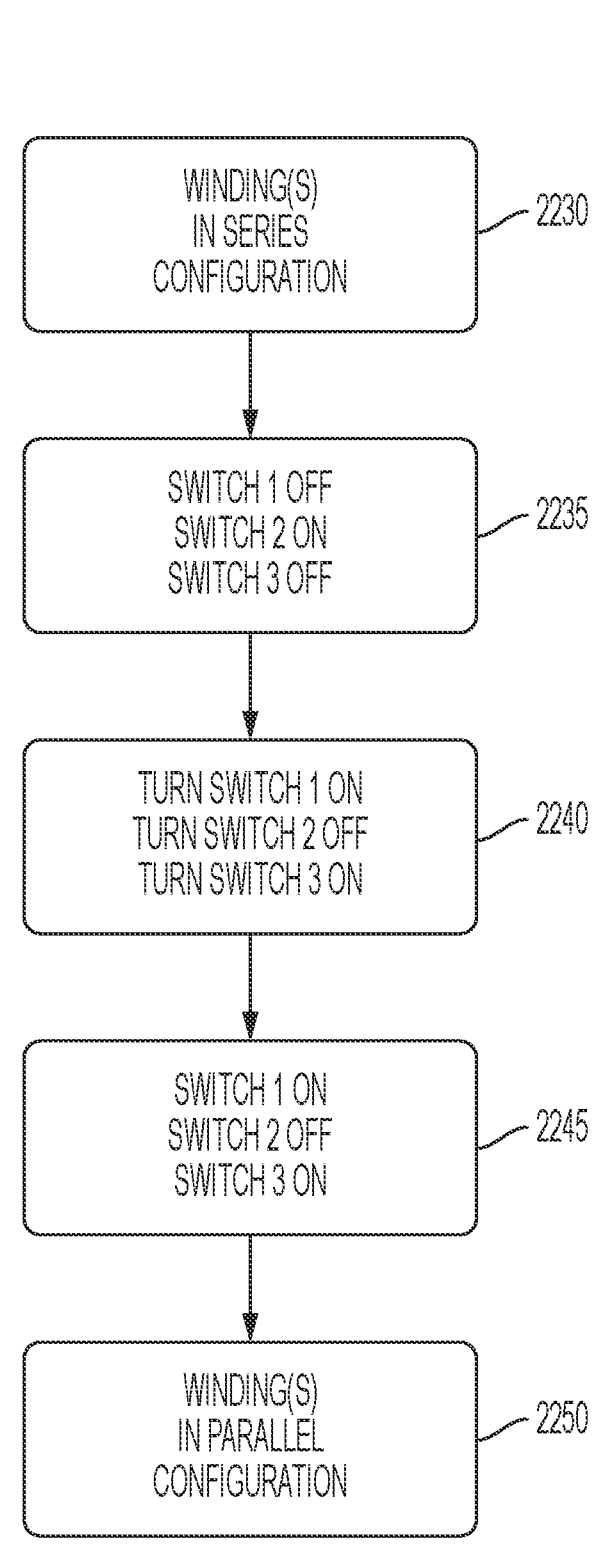
FIG. 22B is a process for changing a motor configuration, according to embodiments described herein.

FIG. 22B is a process 2225 for switching the circuit 1900 of FIG. 19 from the SERIES configuration for a stator phase to the PARALLEL configuration for the stator phase. At STEP 2230, the power tool 100 is being operated by the controller 200 with the windings of the stator 340 in the SERIES configuration. In the SERIES configuration, the first switching point 1905 is OFF, the second switching point 1910 is ON, and the third switching point 1915 is OFF (STEP 2235). When the controller 200 switches from the SERIES configuration to the PARALLEL configuration, the first switching point 1905 is turned ON, the second switch-ing point 1910 is turned OFF, and the third switching point 1915 is turned ON (STEP 2240). The windings of the stator 340 are now in the PARALLEL configuration and the first switching point 1905 is ON, the second switching point 1910 is OFF, and the third switching point 1915 is ON (STEP 2245). The controller 200 then operates the power tool 100 and the motor 275 with the stator windings in the PARALLEL configuration (STEP 2250). Although the pro-cess 2225 is described generally with respect to a single stator phase of the motor 275, the same process can be performed for each stator phase of the motor 275 (e.g., three phases).

Figure 22C:
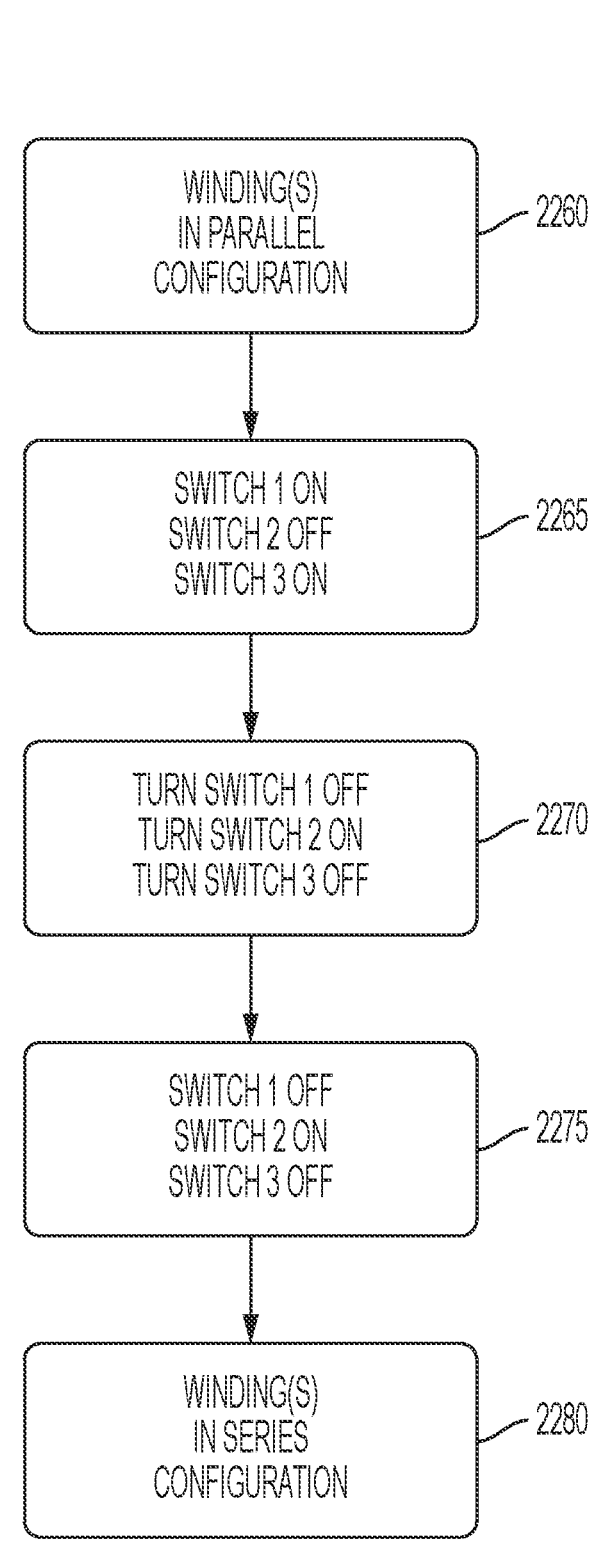
FIG. 22C is a process for changing a motor configuration, according to embodiments described herein.

FIG. 22C is a process 2255 for switching the circuit 1900 of FIG. 19 from the PARALLEL configuration for a stator phase to the SERIES configuration for the stator phase. At STEP 2260, the power tool 100 is being operated by the controller 200 with the windings of the stator 340 in the PARALLEL configuration. In the PARALLEL configura-tion, the first switching point 1905 is ON, the second switching point 1910 is OFF, and the third switching point 1915 is ON (STEP 2265). When the controller 200 switches from the PARALLEL configuration to the SERIES configu-ration, the first switching point 1905 is turned OFF, the second switching point 1910 is turned ON, and the third switching point 1915 is turned OFF (STEP 2270). The windings of the stator 340 are now in the SERIES configu-ration and the first switching point 1905 is OFF, the second switching point 1910 is ON, and the third switching point 1915 is OFF (STEP 2275). The controller 200 then operates the power tool 100 and the motor 275 with the stator windings in the SERIES configuration (STEP 2280). Although the process 2255 is described generally with respect to a single stator phase of the motor 275, the same process can be performed for each stator phase of the motor 275 (e.g., three phases).

The controller 200 can control the configuration between both the DELTA and WYE configurations and the SERIES and PARALLEL configurations. Accordingly, four possible torque-speed tradeoffs are achievable. The torque-speed tradeoffs for the four possible motor configurations are provided below in TABLE #1.

TABLE #1

| MOTOR CONFIGURATION TORQUE/SPEED TRADEOFFS | | |
|---|---|---|
| DELTA/WYE | SERIES/PARALLEL | Torque/Speed Tradeoff |
| DELTA | PARALLEL | 3.46 |
| WYE | PARALLEL | 2 |
| DELTA | SERIES | 1.73 |
| WYE | SERIES | 1 |

Figure 23:
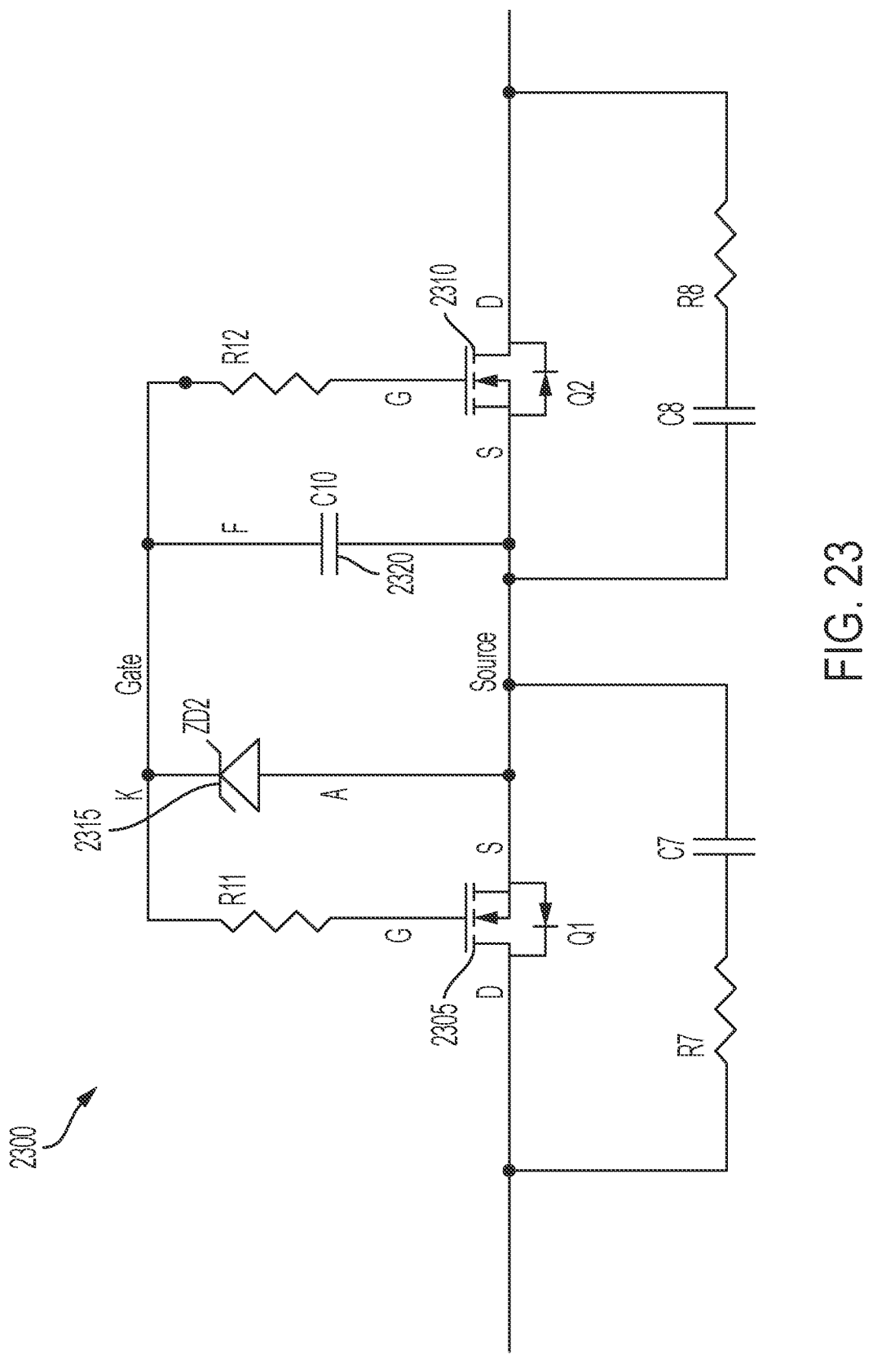
FIG. 23 illustrates a switching circuit for configuring a motor, according to embodiments described herein.

As described above, the switches that are used to control the shifting of the motor 275 between the DELTA configu-ration and the WYE configuration of the stator 340, or between the PARALLEL configured stator windings and SERIES configured stator windings, can be configured as back-to-back switches sharing a common source or a com-mon drain. FIG. 23 illustrates a switching circuit 2300 for such a switch configuration. In the embodiment illustrated in FIG. 23, two back-to-back MOSFETS 2305, 2310 form the four quadrant switch. In the switching circuit 2300, the resistors R7, R8 and capacitors C7, C8 form a snubber circuit that reduces the transient voltage seen across the MOSFETS 2305, 2310. A Zener diode 2315 and a capacitor 2320 reduce noise on the gate drive signals for the MOS-FETS 2305, 2310.

Figure 24:
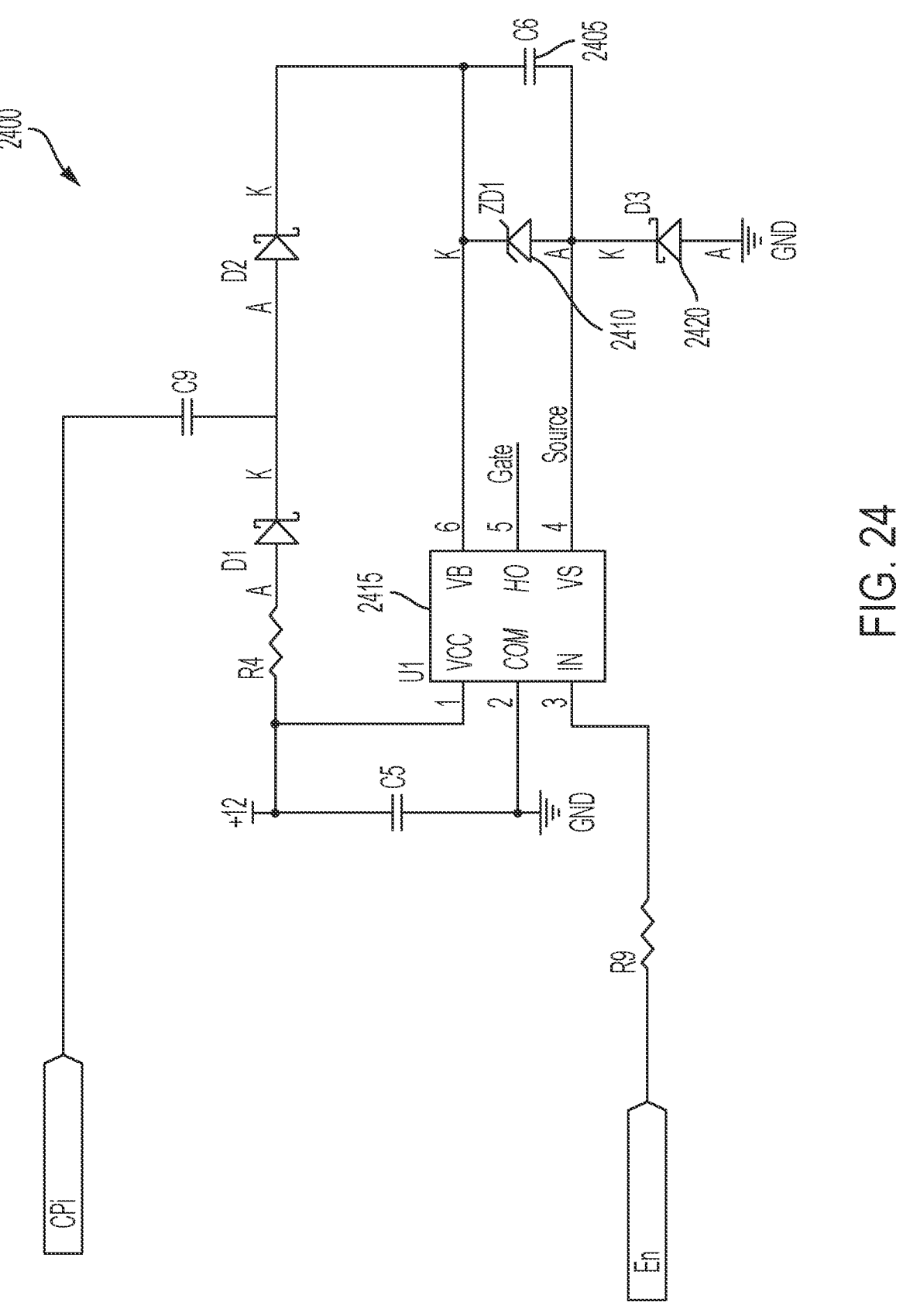
FIG. 24 illustrates a bootstrap charge pump circuit and a gate driver for driving the switching circuit of FIG. 23.

FIG. 24 illustrates a gate drive circuit 2400 for driving the MOSFETS 2305, 2310 of FIG. 23. A capacitor 2405 forms a bootstrap capacitor. A Zener diode 2410 clamps the voltage across the capacitor 2405 to a voltage (e.g., 20V) that is survivable by an integrated circuit 2415. In the event of a large negative transient voltage, a diode (e.g., a Schottkey diode) 2420 on the power rail protects the gate driver from blowing out. Specifically, in the event of a negative voltage on pin Vb, an internal diode of the integrated circuit 2415 becomes forward conducting from ground to Vb. This internal diode cannot carry a significant current and will fail as a result of the large negative transient voltage. Failure of the internal diode can be observed as Vb shorting to Vs. By placing the diode 2420 to Vs instead of Vb, transient voltage can be added to the capacitor 2405 before the integrated circuit 2415 is at risk of failure. In some embodiments, a resistor may be connected between the MOSFETS 2305, 2310 of FIG. 23, and the Vs pin of the integrated circuit 2415 to reduce the transient potential to the gate driver.

The motor control and configuration techniques described herein can be applied to any of a variety of different applications to achieve desirable power tool output characteristics. For example, these techniques can be applied to a vacuum cleaner and a configuration shift point can be based on air pressure, motor speed, motor current, etc. The configuration shift (e.g., DELTA to WYE) can be executed when high suction is needed, as a means to clear a vacuum filter of debris (e.g., high power pulses of airflow or suction), to maximize run time, etc. The configuration shift can also be executed when the vacuum or other power tool (e.g., a belt sander) is unloaded or in an economy mode to reduce current draw.

The motor control and configuration techniques can also be implemented in a nailer. For example, startup of the nailer is stall event. The motor could be configured in the WYE configuration to decrease the current required to activate the striker mechanism. After the striker is released and the lifter free-wheels at no load, the motor could be run in the DELTA configuration to increase the speed of reset on the nailer (e.g., increase fire rate and decrease time to fire). In some embodiments, the configuration of the motor in the nailer is based on a temperature of the nailer or the nailer's environment. In some embodiments, the configuration of the motor in the nailer is based on the size of the nails inserted into the nailer and/or a speed setting for the nailer. Similarly, a rivet tool could control the configuration of its motor based on whether stainless steel or aluminum rivets are being used or the size of the rivets (e.g., $\frac{1}{8}^{th}$ versus $\frac{1}{4}$ rivets. For tightening operations, motor configuration can be selected based on output size (e.g., bit size).

The motor control and configuration techniques can also be implemented in saws. For example, with a table saw, the motor configuration can be selected based on depth of cut. For depths greater than a predetermined value, the motor is shifted to the WYE configuration. Similarly, motor configuration can be based on a material being cut. For materials such as dry-wall that produce relatively less loading, the DELTA configuration can be used. For materials such as concrete or tile that produce relatively high loading, the WYE configuration can be used.

Figure 25:
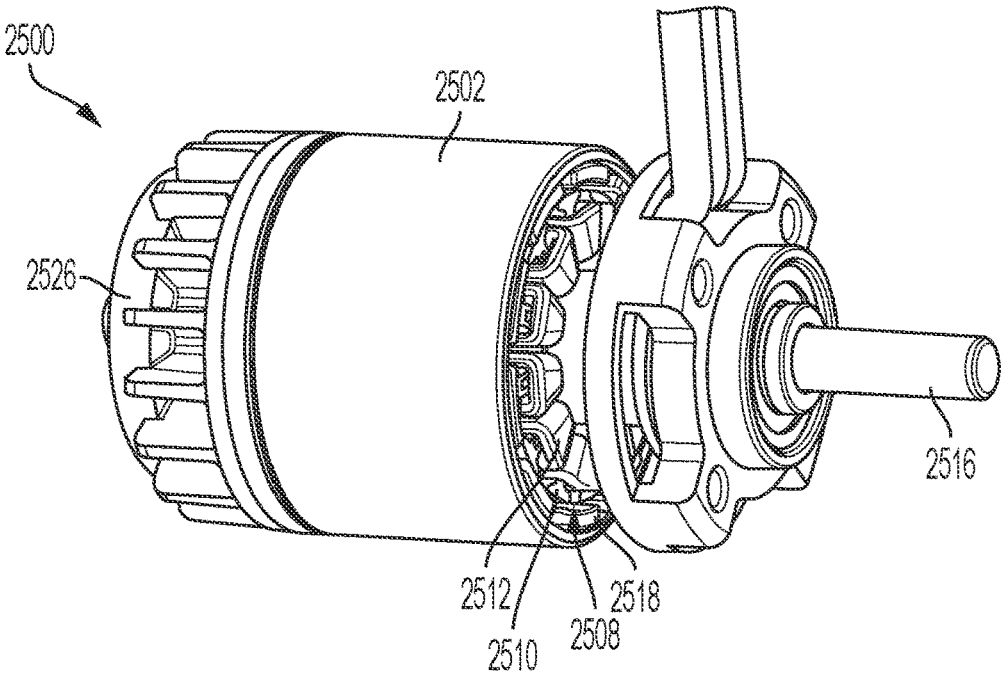
FIG. 25 illustrates an outer rotor electric motor, according to embodiments described herein.
Figure 26:
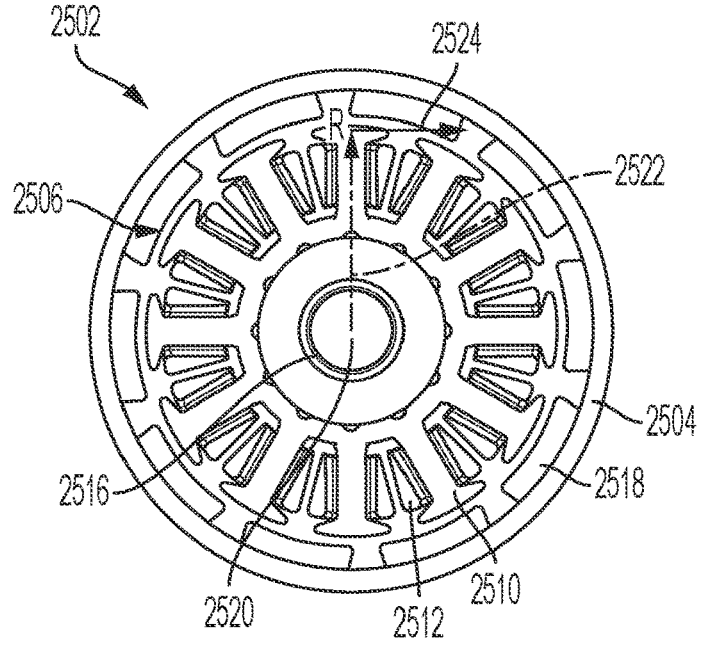
FIG. 26 illustrates a sectional view of the outer rotor electric motor of FIG. 25, according to embodiments described herein.

FIG. 25-26 illustrate an outer rotor electric motor 2500 for use in the power tool 100 implementing the motor switching circuits disclosed herein. Specifically, FIG. 25 illustrates a profile of the outer rotor motor 2500, and FIG. 26 illustrates a sectional view of the outer rotor electric motor 2500. The outer rotor electric motor 2500 includes a rotor 2502 with a hollow armature 2504 surrounding a stator 2506, the stator 2506 being positioned at the center of the hollow armature 2504. The stator 2506 includes lamination stacks 2508 that are locked together by a pinning element and form stator teeth 2510. The stator teeth 2510 are wrapped by stator windings 2512. The rotor 2502 includes an output shaft 2516 connected to the rotor 2502. The output shaft 2516 is configured to rotate with the rotor 2502. The rotor 2502 includes permanent magnets 2518 positioned around a rotational center 2520 of the output shaft 2516. A radius of rotation 2522 of the stator 2506 can be drawn from the rotational center 2520 of the output shaft 2516. As with the inner rotor electric motor 2500, a torque output of the outer rotor electric motor 2500 can be determined based upon the radius of rotation 2522 multiplied by a force vector 2524 produced by electromagnetic forces of the stator 2506 on the permanent magnets 2418 of the rotor 1252 during operation of the outer rotor electric motor 2500. A fan 2526 is positioned at one end of the outer rotor motor 2500 to help cool the outer rotor motor 2500 during operation. In some embodiments, the outer diameter of the rotor 2502 of the motor 2500 is approximately 25 mm. In other embodiments, the outer diameter of the rotor 2502 of the motor 2500 has a value of between 15 mm and 36 mm. In some embodiments, the length of the stator 2506 is between approximately 35 mm and 60 mm.

Thus, embodiments described herein provide, among other things, motor switching circuits for switching between DELTA and WYE stator configurations and PARALLEL and SERIES stator winding configurations. Various features and advantages are set forth in the following claims.

What is claimed is:

1. A power tool comprising:
an electric motor having a plurality of stator windings, the stator windings defining a plurality of phases, the plurality of phases including:
a first phase, a second phase, and a third phase, and
a first stator winding pair, a second stator winding pair, and a third stator winding pair;
a plurality of switches for selectively coupling the plurality of stator windings in a first configuration or a second configuration, the plurality of switches including a first switch, a second switch, a third switch, a fourth switch, and a fifth switch, the plurality of switches connected to the plurality of phases; and
a controller connected to the plurality of switches, the controller configured to:
control the plurality of switches to configure the plurality of stator windings in the first configuration,
monitor a condition of the power tool, and
control the plurality of switches to reconfigure the plurality of stator windings from the first configuration to the second configuration based on a detected change in the condition of the power tool.

2. The power tool of claim 1, wherein, the controller is further configured to control, prior to controlling the plurality of switches to reconfigure the plurality of stator windings from the first configuration to the second configuration, the plurality of switches to coast the motor for an amount of time.

3. The power tool of claim 1, further comprising:
a trigger configured to operably activate the electric motor in response to actuation of the trigger, and
a force sensor configured to detect a grip strength,
wherein the condition is the grip strength being greater than or equal to a grip strength threshold.

4. The power tool of claim 1, further comprising at least one of a thermal accumulator and a temperature sensor, the controller further configured to determine a temperature of the motor using the at least one of the thermal accumulator and the temperature sensor,
wherein the condition is the temperature of the motor being greater than or equal to a temperature threshold.

5. The power tool of claim 1, further comprising a battery pack interface configured to receive a battery pack,
 wherein the condition is a type of the battery pack received by the battery pack interface.

6. The power tool of claim 1, wherein:
the plurality of phases further includes a fourth phase; and
the first switch is connected between the first phase and the fourth phase, the second switch is connected between the third phase and the third switch, and the third switch is connected between the second phase and the second switch.

7. The power tool of claim 1, wherein:
the first switch is connected between the second stator winding pair and the first stator winding pair;
the second switch is connected between the first stator winding pair and the first phase;
the third switch is connected between the second stator winding pair and the second phase;
the fourth switch is connected between the third phase and the third stator winding pair; and
the fifth switch is connected between the third stator winding pair and the first stator winding pair.

8. The power tool of claim 1, wherein:
the first configuration is a delta configuration; and
the second configuration is a wye configuration.

9. The power tool of claim 1, wherein the controller is further configured to:
 monitor, after controlling the plurality of switches to reconfigure the plurality of stator windings from the first configuration to the second configuration based on the condition of the power tool, the condition of the power tool, and
 control the plurality of switches to reconfigure the plurality of stator windings from the second configuration to the first configuration based on a second detected change in the condition of the power tool.

10. The power tool of claim 9, wherein:
the condition is a torque value; and
the controller controls the plurality of switches to reconfigure the plurality of stator windings from the first configuration to the second configuration at a higher torque value than the torque value at which the controller controls the plurality of switches to reconfigure the plurality of stator windings from the second configuration to the first configuration.

11. A method for operating a power tool having a user interface and an electric motor, the electric motor including a plurality of stator windings, the method comprising:
 controlling a plurality of switches to configure the plurality of stator windings in a first configuration
 monitoring a condition of the power tool based on an input provided via the user interface; and
 controlling the plurality of switches to reconfigure the plurality of stator windings from the first configuration to a second configuration based on a detected change in the condition of the power tool received via the user interface.

12. The method of claim 11, further comprising:
 controlling, prior to controlling the plurality of switches to reconfigure the plurality of stator windings from the first configuration to the second configuration, the plurality of switches to coast the motor for an amount of time.

13. The method of claim 11, wherein:
the plurality of stator windings includes a plurality of phases connected to the plurality of switches; and
the plurality of phases includes a first phase, a second phase, and a third phase.

14. The method of claim 13, wherein:
the plurality of phases further includes a fourth phase;
the plurality of switches includes a first switch, a second switch, and a third switch; and
the first switch is connected between the first phase and the fourth phase, the second switch is connected between the third phase and the third switch, and the third switch is connected between the second phase and the second switch.

15. The method of claim 11, wherein the condition of the electric motor is a position of a rotor of the electric motor.

16. A power tool comprising:
an electric motor having a plurality of stator windings, each of the plurality of stator windings including a plurality of phases, the plurality of phases including:
 a first phase, a second phase, a third phase, and a fourth phase, and
 a first stator winding pair, a second stator winding pair, and a third stator winding pair;
a plurality of switches for selectively coupling the first phase winding and the second phase winding in a first configuration or a second configuration, the plurality of switches including a first switch, a second switch, and a third switch, the plurality of switches connected to the plurality of phases, wherein
 the first switch is connected between the first phase and the fourth phase,
 the second switch is connected between the third phase and the third switch, and
 the third switch is connected between the second phase and the second switch; and
a controller connected to the plurality of switches, the controller configured to:
 control the plurality of switches to configure each of the first phase windings and the second phase windings in the first configuration,
 monitor a condition of the power tool, and
 control the plurality of switches to reconfigure each of the first phase windings and the second phase windings from the first configuration to the second configuration based on a detected change in the condition of the power tool.

17. The power tool of claim 16, wherein the first configuration is a parallel configuration and wherein the second configuration is a series configuration.

18. The power tool of claim 16, wherein the plurality of switches includes at least eighteen switches for configuring each of the first phase windings and the second phase windings in the first configuration or the second configuration.

* * * * *